(12) United States Patent
Sumasu et al.

(10) Patent No.: US 10,734,936 B2
(45) Date of Patent: Aug. 4, 2020

(54) MOTOR CONTROL DEVICE

(71) Applicant: JTEKT CORPORATION, Osaka-shi, Osaka (JP)

(72) Inventors: Hiroshi Sumasu, Kashihara (JP); Koichiro Matsuhisa, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/396,143

(22) Filed: Apr. 26, 2019

(65) Prior Publication Data

US 2019/0341869 A1  Nov. 7, 2019

(30) Foreign Application Priority Data

May 1, 2018 (JP) ................. 2018-088408

(51) Int. Cl.
*H02P 27/08* (2006.01)
*H02P 21/22* (2016.01)
*H02M 7/5387* (2007.01)

(52) U.S. Cl.
CPC ........ *H02P 27/08* (2013.01); *H02M 7/53871* (2013.01); *H02P 21/22* (2016.02)

(58) Field of Classification Search
CPC ................................ H02P 27/08; H02P 21/22
USPC ................................ 318/400.24, 400.01, 700
See application file for complete search history.

(56) References Cited

U.S. PATENT DOCUMENTS 7,701,159 B2 * 4/2010 Chida ................. H02P 29/50
  318/400.01
2011/0260656 A1  10/2011 Kazama et al.
2013/0062138 A1   3/2013 Naitou et al.

FOREIGN PATENT DOCUMENTS

JP   S64-50766 A   2/1989
JP   2016-100952 A  5/2016

OTHER PUBLICATIONS

Jul. 8, 2019 Extended Search Report issued in European Application No. 19171869.1.

* cited by examiner

*Primary Examiner* — David Luo
(74) *Attorney, Agent, or Firm* — Oliff PLC

(57) ABSTRACT

A motor control device includes: a noise reduction unit that sets a PWM count in units of PWM cycles for each PWM cycle in a current control cycle such that a current that flows through a frame ground because of a phase voltage for any one of three phases is canceled out with a current that flows through the frame ground because of a phase voltage for one of the two other phases in each PWM cycle in the current control cycle; and a noise canceling circuit configured to generate a current that is opposite in phase to a current that flows through the frame ground because of a phase voltage for the other of the two other phases in each PWM cycle in the current control cycle.

4 Claims, 18 Drawing Sheets

*FIG. 11A*

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S1 | 400 | 400 | 400 | 400 | 400 | 400 | 400 | 400 | 400 | 400 | 4000 |
| Cv SET IN S1 | 300 | 300 | 300 | 300 | 300 | 300 | 300 | 300 | 300 | 300 | 3000 |
| Cw SET IN S1 | 100 | 100 | 100 | 100 | 100 | 100 | 100 | 100 | 100 | 100 | 1000 |

*FIG. 11B*

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S2 | 400 | 400 | 400 | 400 | 400 | 400 | 400 | 400 | 400 | 400 | 4000 |
| Cv SET IN S2 | 290 | 290 | 290 | 290 | 290 | 290 | 290 | 290 | 290 | 290 | 2900 |
| Cw SET IN S2 | 110 | 110 | 110 | 110 | 110 | 110 | 110 | 110 | 110 | 100 | 1100 |

FIG. 12A

| CYCLE NUMBER i | 1 | 2 | 3 | 4 | 5 | 6 | 7 | 8 | 9 | 10 | TOTAL |
|---|---|---|---|---|---|---|---|---|---|---|---|
| FIRST AMPLITUDE PATTERN | x | -x | x | -x | x | -x | x | -x | x | -x | 0 |
| SECOND AMPLITUDE PATTERN | -x | x | -x | x | -x | x | -x | x | -x | x | 0 |

FIG. 12B

| CYCLE NUMBER i | 1 | 2 | 3 | 4 | 5 | 6 | 7 | 8 | 9 | 10 | TOTAL |
|---|---|---|---|---|---|---|---|---|---|---|---|
| AMPLITUDE FOR V-PHASE | 110 | -110 | 110 | -110 | 110 | -110 | 110 | -110 | 110 | -110 | 0 |
| AMPLITUDE FOR W-PHASE | -70 | 70 | -70 | 70 | -70 | 70 | -70 | 70 | -70 | 70 | 0 |

FIG. 12C

| CYCLE NUMBER i | 1 | 2 | 3 | 4 | 5 | 6 | 7 | 8 | 9 | 10 | TOTAL |
|---|---|---|---|---|---|---|---|---|---|---|---|
| FINAL Cu | 400 | 400 | 400 | 400 | 400 | 400 | 400 | 400 | 400 | 400 | 4000 |
| FINAL Cv | 410 | 190 | 410 | 190 | 410 | 190 | 410 | 190 | 410 | 190 | 3000 |
| FINAL Cw | 30 | 170 | 30 | 170 | 30 | 170 | 30 | 170 | 30 | 170 | 1000 |

FIG. 12D

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu AT ACTUAL TIMING | 400 | 400 | 400 | 400 | 400 | 400 | 400 | 400 | 400 | 400 | 4000 |
| Cv AT ACTUAL TIMING | 400 | 180 | 400 | 180 | 400 | 180 | 400 | 180 | 400 | 180 | 2900 |
| Cw AT ACTUAL TIMING | 40 | 180 | 40 | 180 | 40 | 180 | 40 | 180 | 40 | 180 | 1100 |

*FIG. 13A*

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S1 | 360 | 360 | 360 | 360 | 360 | 360 | 360 | 360 | 360 | 360 | 3600 |
| Cv SET IN S1 | 400 | 400 | 400 | 400 | 400 | 400 | 400 | 400 | 400 | 400 | 4000 |
| Cw SET IN S1 | 280 | 280 | 280 | 280 | 280 | 280 | 280 | 280 | 280 | 280 | 2800 |

*FIG. 13B*

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu SET IN S2 | 360 | 360 | 360 | 360 | 360 | 360 | 360 | 360 | 360 | 360 | 3600 |
| Cv SET IN S2 | 390 | 390 | 390 | 390 | 390 | 390 | 390 | 390 | 390 | 390 | 3900 |
| Cw SET IN S2 | 280 | 280 | 280 | 280 | 280 | 280 | 280 | 280 | 280 | 280 | 2800 |

FIG. 14A

| CYCLE NUMBER i | 1 | 2 | 3 | 4 | 5 | 6 | 7 | 8 | 9 | 10 | TOTAL |
|---|---|---|---|---|---|---|---|---|---|---|---|
| FIRST AMPLITUDE PATTERN | x | -x | x | -x | x | -x | x | -x | x | -x | 0 |
| SECOND AMPLITUDE PATTERN | -x | x | -x | x | -x | x | -x | x | -x | x | 0 |

FIG. 14B

| CYCLE NUMBER i | 1 | 2 | 3 | 4 | 5 | 6 | 7 | 8 | 9 | 10 | TOTAL |
|---|---|---|---|---|---|---|---|---|---|---|---|
| AMPLITUDE FOR U-PHASE | 30 | -30 | 30 | -30 | 30 | -30 | 30 | -30 | 30 | -30 | 0 |
| AMPLITUDE FOR W-PHASE | -110 | 110 | -110 | 110 | -110 | 110 | -110 | 110 | -110 | 110 | 0 |

FIG. 14C

| CYCLE NUMBER i | 1 | 2 | 3 | 4 | 5 | 6 | 7 | 8 | 9 | 10 | TOTAL |
|---|---|---|---|---|---|---|---|---|---|---|---|
| FINAL Cu | 390 | 330 | 390 | 330 | 390 | 330 | 390 | 330 | 390 | 330 | 3600 |
| FINAL Cv | 400 | 400 | 400 | 400 | 400 | 400 | 400 | 400 | 400 | 400 | 4000 |
| FINAL Cw | 170 | 390 | 170 | 390 | 170 | 390 | 170 | 390 | 170 | 390 | 2800 |

FIG. 14D

| CYCLE NUMBER i | 1 | 2 | 3 | 4 | 5 | 6 | 7 | 8 | 9 | 10 | TOTAL |
|---|---|---|---|---|---|---|---|---|---|---|---|
| Cu AT ACTUAL TIMING | 390 | 330 | 390 | 330 | 390 | 330 | 390 | 330 | 390 | 330 | 3600 |
| Cv AT ACTUAL TIMING | 390 | 390 | 390 | 390 | 390 | 390 | 390 | 390 | 390 | 390 | 3900 |
| Cw AT ACTUAL TIMING | 170 | 390 | 170 | 390 | 170 | 390 | 170 | 390 | 170 | 390 | 2800 |

FIG. 15A

| CYCLE NUMBER i | 1 | 2 | 3 | 4 | 5 | 6 | 7 | 8 | 9 | 10 |
|---|---|---|---|---|---|---|---|---|---|---|
| PWM COUNT | 40 | 400 | 40 | 400 | 40 | 400 | 40 | 400 | 40 | 400 |

FIG. 15B

| CYCLE NUMBER i | 1 | 2 | 3 | 4 | 5 | 6 | 7 | 8 | 9 | 10 |
|---|---|---|---|---|---|---|---|---|---|---|
| PWM COUNT | 50 | 410 | 50 | 410 | 50 | 410 | 50 | 410 | 50 | 410 |

MOTOR CONTROL DEVICE

INCORPORATION BY REFERENCE

The disclosure of Japanese Patent Application No. 2018-088408 filed May 1, 2018 including the specification, drawings and abstract, is incorporated herein by reference in its entirety.

BACKGROUND OF THE INVENTION

1. Field of the Invention

The present invention relates to a motor control device configured to drive an electric motor through pulse width modulation (PWM).

2. Description of the Related Art

In a motor control device that performs vector control on a three-phase electric motor, two-phase current command values are computed in each current control cycle. Two-phase voltage command values are computed on the basis of the deviation between the two-phase current command values and detected two-phase current values. The two-phase voltage command values are subjected to a two-phase/three-phase conversion performed using the rotational angle of the electric motor. Consequently, phase voltage command values (three-phase voltage command values) for U-phase, V-phase, and W-phase are computed. A U-phase PWM signal, a V-phase PWM signal, and a W-phase PWM signal with a duty corresponding to the phase voltage command values for U-phase, V-phase, and W-phase are generated, and supplied to a three-phase inverter circuit.

Six switching elements that constitute the three-phase inverter circuit are controlled in accordance with the U-phase PWM signal, the V-phase PWM signal, and the W-phase PWM signal. Consequently, a voltage corresponding to the three-phase voltage command values is applied to the three-phase electric motor. Consequently, a motor current that flows through the three-phase electric motor is controlled so as to be equal to the two-phase current command values. (See Japanese Patent Application Publication No. 1-50766 (JP 1-50766 A).)

In the motor control device discussed earlier, a current flows through a stray capacitance that is present between a frame ground, to which the negative terminal of the power source is connected, and the three-phase electric motor at the time of rise and the time of fall of phase voltages for respective phases in each PWM cycle. Since this current flows through the frame ground, noise may be radiated from the frame ground. In the case where the motor control device is mounted on an electric power steering (EPS) system mounted on a vehicle, long positive and negative power supply lines extend from a vehicle power source (battery) to the EPS. Therefore, a noise current that flows through the frame ground intrudes into the positive and negative power supply lines in the vicinity of the vehicle power source through the stray capacitance, which is formed between the positive and negative power supply lines and the frame ground, to generate common mode noise.

SUMMARY OF THE INVENTION

An object of the present invention is to provide a motor control device that is capable of effectively reducing common mode noise.

An aspect of the present invention provides a motor control device that includes a three-phase inverter configured to drive an electric motor having a housing connected to a frame ground to which a negative terminal of a power source is connected, and a control unit that controls the three-phase inverter on the basis of a PWM signal in units of PWM cycles generated for each PWM cycle, a current control cycle including a plurality of PWM cycles, the motor control device including: a PWM count computation unit that computes a PWM count in units of current control cycles for each of three phases for each current control cycle; a noise reduction unit that sets a PWM count in units of PWM cycles for each PWM cycle in the current control cycle such that a total value of PWM counts for each phase in units of PWM cycles in the current control cycle is a value that matches a PWM count in units of current control cycles for the corresponding phase, and such that a current that flows through the frame ground because of a phase voltage for any one of the three phases is canceled out with a current that flows through the frame ground because of a phase voltage for one of the two other phases in each PWM cycle in the current control cycle; and a noise canceling circuit configured to generate a current that is opposite in phase to a current that flows through the frame ground because of a phase voltage for the other of the two other phases in each PWM cycle in the current control cycle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11A is a schematic table illustrating an example of PWM counts in units of PWM cycles for each phase set in step S1 in FIG. 8;

FIG. 11B is a schematic table illustrating an example of PWM counts in units of PWM cycles for each phase set in step S2 in FIG. 8;

FIG. 12A is a schematic table illustrating an example of two amplitude patterns;

FIG. 12B is a schematic table illustrating an example of an amplitude in each PWM cycle for V-phase and W-phase;

FIG. 12C is a schematic table illustrating an example of the final PWM count for each phase in each PWM cycle;

FIG. 12D is a schematic table illustrating a PWM count corresponding to the level variation timing of each phase voltage that matches the final PWM count indicated in FIG. 12C;

FIG. 13A is a schematic table illustrating a different example of PWM counts in units of PWM cycles for each phase set in step S1 in FIG. 8;

FIG. 13B is a schematic table illustrating a different example of PWM counts in units of PWM cycles for each phase set in step S2 in FIG. 8;

FIG. 14A is a schematic table illustrating an example of two amplitude patterns;

FIG. 14B is a schematic table illustrating an example of an amplitude in each PWM cycle for U-phase and W-phase;

FIG. 14C is a schematic table illustrating an example of the final PWM count for each phase in each PWM cycle;

FIG. 14D is a schematic table illustrating a PWM count corresponding to the level variation timing of each phase voltage that matches the final PWM count indicated in FIG. 14C;

FIG. 15A is a schematic table illustrating an example of a PWM count set by a canceling circuit control unit in the case where the point of connection between an upper FET and a lower FET in a noise canceling circuit is pulled down;

FIG. 15B is a schematic table illustrating an example of a PWM count set by the canceling circuit control unit in the case where the point of connection between the upper FET and the lower FET in the noise canceling circuit is pulled up;

DETAILED DESCRIPTION OF EMBODIMENTS

Figure 1:
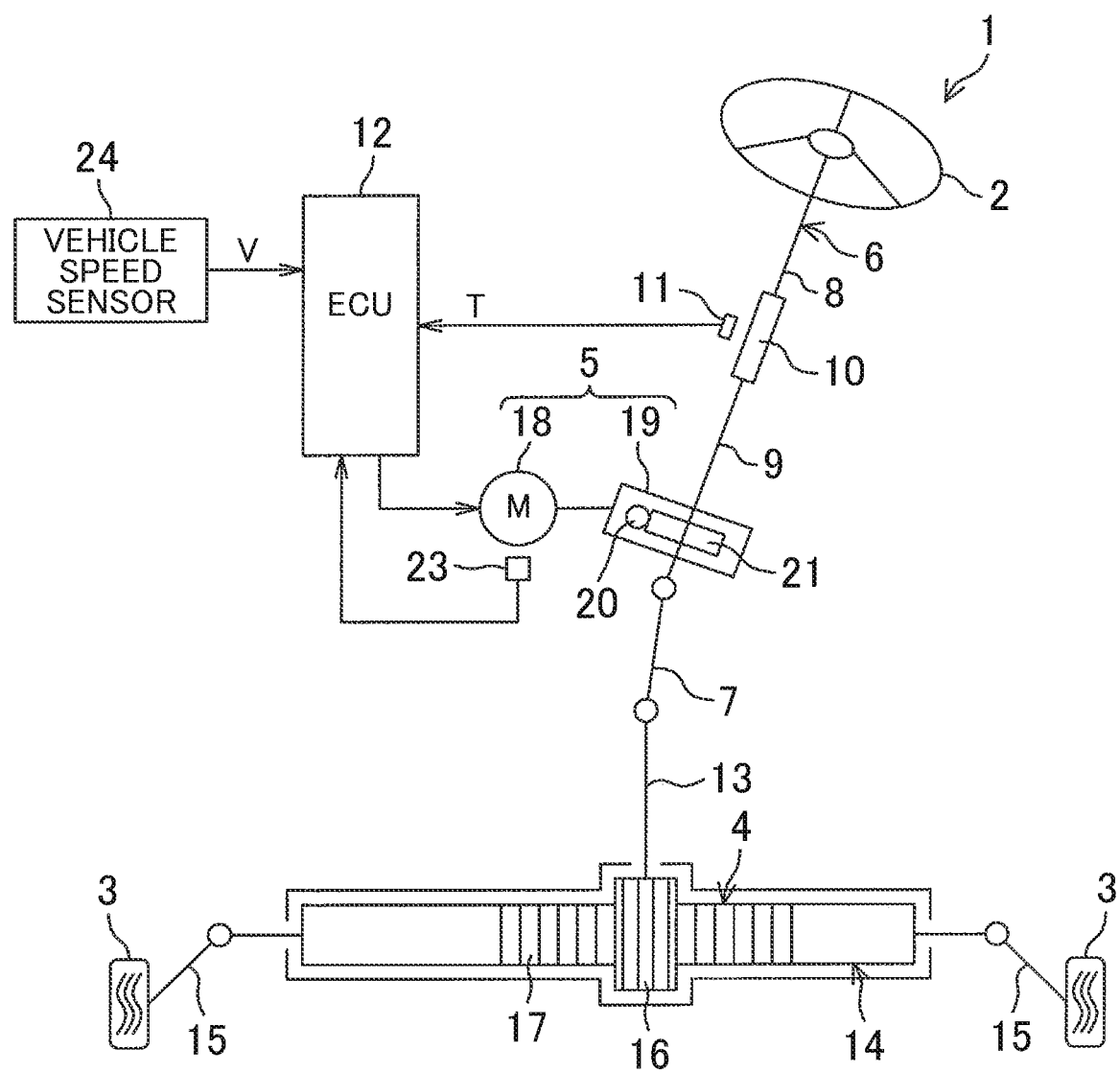
FIG. 1 is a schematic diagram illustrating a schematic configuration of an electric power steering system to which a motor control device according to an embodiment of the present invention is applied.

An embodiment in which the present invention is applied to an electric power steering system will be described in detail below with reference to the accompanying drawings. FIG. 1 is a schematic diagram illustrating a schematic configuration of an electric power steering system to which a motor control device according to an embodiment of the present invention is applied. An electric power steering (EPS) system 1 includes a steering wheel 2, a steering operation mechanism 4, and a steering assist mechanism 5. The steering wheel 2 is a steering member configured to steer the vehicle. The steering operation mechanism 4 steers steered wheels 3 in conjunction with rotation of the steering wheel 2. The steering assist mechanism 5 assists a driver in steering. The steering wheel 2 and the steering operation mechanism 4 are mechanically coupled to each other via a steering shaft 6 and an intermediate shaft 7.

The steering shaft 6 includes an input shaft 8 coupled to the steering wheel 2, and an output shaft 9 coupled to the intermediate shaft 7. The input shaft 8 and the output shaft 9 are coupled so as to be rotatable relative to each other via a torsion bar 10. A torque sensor 11 is disposed in the vicinity of the torsion bar 10. The torque sensor 11 detects steering torque T applied to the steering wheel 2 on the basis of the amount of relative rotational displacement between the input shaft 8 and the output shaft 9. In the embodiment, the steering torque T which is detected by the torque sensor 11 is detected as a positive value when the vehicle is steered to the right, and as a negative value when the vehicle is steered to the left, for example. The magnitude of the steering torque T is larger as the absolute value of the positive or negative value is larger.

The steering operation mechanism 4 is a rack-and-pinion mechanism that includes a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end (the lower end in FIG. 1) of the pinion shaft 13.

The rack shaft 14 extends linearly along the right-left direction of the vehicle. A rack 17 meshed with the pinion 16 is formed at an intermediate portion of the rack shaft 14 in the axial direction. The pinion 16 and the rack 17 convert rotation of the pinion shaft 13 into movement of the rack shaft 14 in the axial direction. The steered wheels 3 can be steered by moving the rack shaft 14 in the axial direction.

When the steering wheel 2 is operated (rotated), rotation of the steering wheel 2 is transferred to the pinion shaft 13 via the steering shaft 6 and the intermediate shaft 7. The pinion 16 and the rack 17 convert rotation of the pinion shaft 13 into movement of the rack shaft 14 in the axial direction. Consequently, the steered wheels 3 are steered. The steering assist mechanism 5 includes an electric motor 18 for steering assist and a speed reduction mechanism 19. The speed reduction mechanism 19 transfers output torque of the electric motor 18 to the steering operation mechanism 4. In the embodiment, the electric motor 18 is a three-phase brushless motor. The electric motor 18 is provided with a rotational angle sensor 23 such as a resolver, for example, configured to detect the rotational angle of a rotor of the electric motor 18. The speed reduction mechanism 19 is a worm gear mechanism that includes a worm shaft 20 and a worm wheel 21 meshed with the worm shaft 20.

The worm shaft 20 is rotationally driven by the electric motor 18. The worm wheel 21 is coupled so as to be rotatable together with the steering shaft 6. The worm wheel 21 is rotationally driven by the worm shaft 20. When the worm shaft 20 is rotationally driven by the electric motor 18, the worm wheel 21 is rotationally driven to rotate the steering shaft 6. Rotation of the steering shaft 6 is transferred to the pinion shaft 13 via the intermediate shaft 7. Rotation of the pinion shaft 13 is converted into movement of the rack shaft 14 in the axial direction. Consequently, the steered wheels 3 are steered. That is, the worm shaft 20 is rotationally driven by the electric motor 18. Consequently, steering assist by the electric motor 18 is enabled.

The vehicle is provided with a vehicle speed sensor 24 configured to detect a vehicle speed V. The steering torque T which is detected by the torque sensor 11, the vehicle speed V which is detected by the vehicle speed sensor 24, an output signal from the rotational angle sensor 23, etc. are input to an electronic control unit (ECU) 12. The ECU 12 controls the electric motor 18 on the basis of such input signals.

Figure 2:
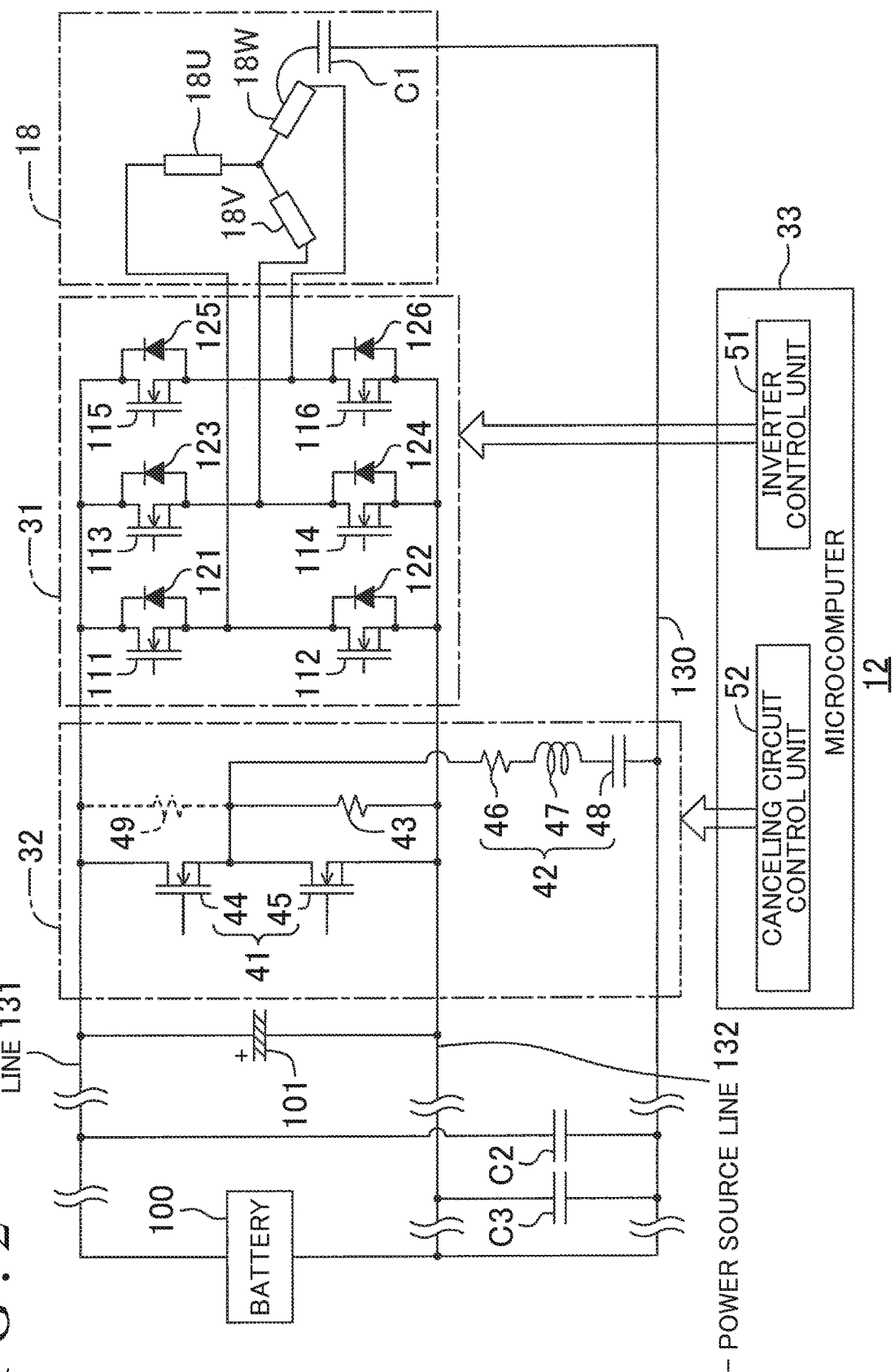
FIG. 2 is a block diagram illustrating the overall electric configuration of an ECU.

FIG. 2 is a block diagram illustrating the overall electric configuration of the ECU 12. The ECU 12 includes a motor drive circuit 31, a noise canceling circuit 32, and a microcomputer 33. The motor drive circuit 31 is a circuit that supplies electric power to the electric motor 18. The noise canceling circuit 32 is a circuit that suppresses common mode noise. The motor drive circuit 31 and the noise canceling circuit 32 are controlled by the microcomputer 33. As discussed later, the motor drive circuit 31 is controlled by an inverter control unit 51. The noise canceling circuit 32 is controlled by a canceling circuit control unit 52.

The electric motor 18 is a three-phase brushless motor, for example. The electric motor 18 includes a rotor (not illustrated) that serves as a field, and a stator that includes stator coils 18U, 18V, and 18W (see FIG. 3) for U-phase, V-phase, and W-phase, respectively. The motor drive circuit 31 is a three-phase inverter. The motor drive circuit 31 includes a smoothing capacitor 101 connected in series with a power source (battery) 100, a plurality of switching elements 111 to 116, and a plurality of diodes 121 to 126. The smoothing capacitor 101 is connected between both terminals of the power source 100. In the embodiment, the switching elements 111 to 116 are each constituted from an n-channel metal oxide semiconductor field effect transistor (MOSFET). Hereinafter, the switching elements 111 to 116 will be occasionally referred to as FETs 111 to 116.

The plurality of FETs 111 to 116 include an upper FET 111 for U-phase, a lower FET 112 for U-phase connected in series thereto, an upper FET 113 for V-phase, a lower FET 114 for V-phase connected in series thereto, an upper FET 115 for W-phase, and a lower FET 116 for W-phase connected in series thereto. The switching elements 111 to 116 are connected in inverse parallel with the diodes 121 to 126, respectively.

The drain of the upper FET 111, 113, 115 is connected to a positive electrode terminal of the smoothing capacitor 101. The source of the upper FET 111, 113, 115 is connected to the drain of the lower FET 112, 114, 116, respectively. The source of the lower FET 112, 114, 116 is connected to a negative electrode terminal of the smoothing capacitor 101. The point of connection between the upper FET 111 and the lower FET 112 for U-phase is connected to the stator coil 18U for U-phase of the electric motor 18. The point of connection between the upper FET 113 and the lower FET 114 for V-phase is connected to the stator coil 18V for V-phase of the electric motor 18. The point of connection between the upper FET 115 and the lower FET 116 for W-phase is connected to the stator coil 18W for W-phase of the electric motor 18. The FETs 111 to 116 are controlled on the basis of a PWM signal output from the inverter control unit 51 to be discussed later.

The power source 100 is mounted on the vehicle. A negative (−) electrode of the power source 100 is electrically connected to a frame (frame ground) 130, which is made of metal, of the vehicle. Therefore, the frame 130 is at the same potential as the negative electrode of the power source 100. The electric power steering system 1 on which the electric motor 18 is mounted is attached to the frame 130 by a bolt or the like. The + power source line and the − power source line of the ECU are connected to the positive and negative electrodes, respectively, of the power source 100 through long lines. The housing of the electric motor 18 is electrically connected to the frame 130. A stray capacitance C1 is present between the stator coils 18U, 18V, and 18W of the electric motor 18 and the housing. Thus, the stray capacitance C1 is present between the electric motor 18 and the frame 130. Meanwhile, stray capacitances C2 and C3 are present between a + power source line 131 and a − power source line 132, respectively, which connect between the power source 100 and the electric power steering system 1 and the frame 130.

The noise canceling circuit 32 includes a half-bridge circuit 41, an RLC circuit 42, and a pull-down resistor 43. The half-bridge circuit 41 is connected to the power source 100 in parallel with the motor drive circuit 31. The half-bridge circuit 41 is a series circuit of two switching elements 44 and 45. The switching elements 44 and 45 are each constituted from an n-channel MOSFET. Hereinafter, the switching element 44 will be occasionally referred to as an upper FET 44, and the switching element 45 will be occasionally referred to as a lower FET 45.

The drain of the upper FET 44 is connected to the + power source line 131. The source of the upper FET 44 is connected to the drain of the lower FET 45. The source of the lower FET 45 is connected to the − power source line 132. The RLC circuit 42 is a series circuit of a resistor 46, a coil 47, and a capacitor 48. The resistor 46 is connected to one end of the coil 47. The capacitor 48 is connected to the other end of the coil 47. One end (end on the resistor 46 side) of the RLC circuit 42 is connected to the point of connection between the upper FET 44 and the lower FET 45. The other end (end on the capacitor 48 side) of the RLC circuit 42 is connected to the frame 130. The point of connection (source of the upper FET 44) between the upper FET 44 and the lower FET 45 is electrically connected to the − power source line 132 via the pull-down resistor 43.

Figure 3:
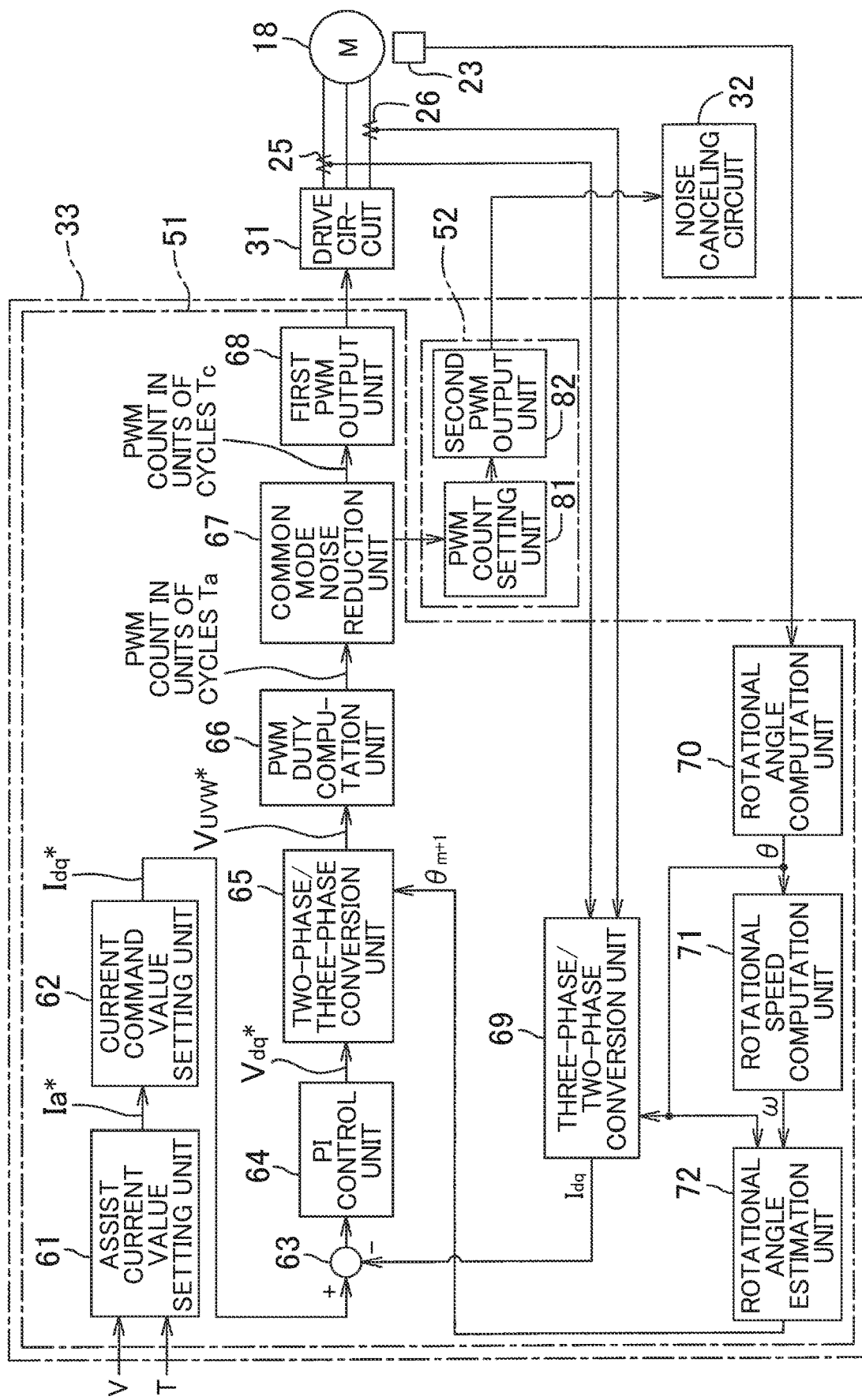
FIG. 3 is a block diagram mainly illustrating the functional configuration of a microcomputer.

FIG. 3 is a block diagram mainly illustrating the functional configuration of the microcomputer 33. Two current sensors 25 and 26 are provided in power supply lines configured to connect between the motor drive circuit 31 and the electric motor 18. Such current sensors 25 and 26 are provided so as to be able to detect phase currents that flow through two of three power supply lines configured to connect between the motor drive circuit 31 and the electric motor 18.

The microcomputer 33 includes a central processing unit (CPU) and a memory (such as a read-only memory (ROM), a random-access memory (RAM), or a non-volatile memory). The microcomputer 33 executes a predetermined program to function as a plurality of function processing units. The plurality of function processing units include the inverter control unit 51 and the canceling circuit control unit 52. The inverter control unit 51 controls the motor drive circuit 31. The canceling circuit control unit 52 controls the noise canceling circuit 32.

The inverter control unit 51 includes an assist current value setting unit 61, a current command value setting unit 62, a current deviation computation unit 63, a proportionalintegral (PI) control unit 64, a two-phase/three-phase conversion unit 65, a PWM duty computation unit 66, a common mode noise reduction unit 67, a first PWM output unit 68, a three-phase/two-phase conversion unit 69, a rotational angle computation unit 70, a rotational speed computation unit 71, and a rotational angle estimation unit 72.

Figure 4A:
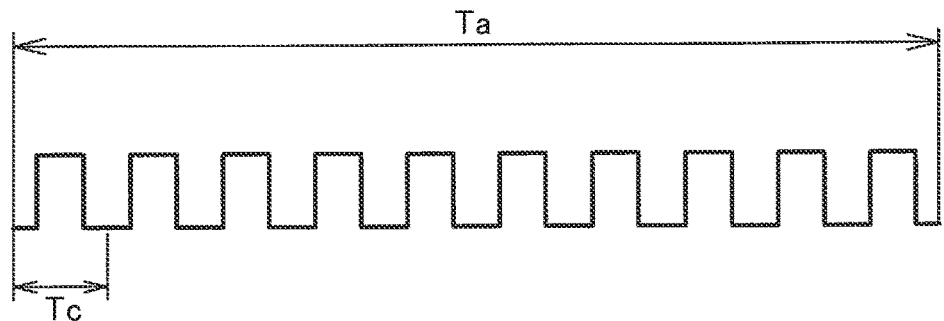
FIG. 4A is a schematic chart illustrating the relationship between a PWM signal cycle Tc and a current control cycle Ta.

As indicated in FIG. 4A, a cycle (hereinafter referred to as a "PWM cycle") Tc of the PWM signal is shorter than a current control cycle Ta. The current control cycle Ta is the computation cycle of the control loop of the motor current. The current control cycle Ta is determined in consideration of the scale of the program, the computation capacity of the microcomputer 33, etc. In the embodiment, PWM duties are updated by the PWM duty computation unit 66 at the first timing in the present current control cycle Ta. Updated PWM duties Cu, Cv, and Cw are output. In the embodiment, Tc is one-tenth of Ta. In other words, each current control cycle Ta includes ten PWM cycles Tc. The first cycle of the ten PWM cycles Tc is occasionally referred to as a first cycle, and the subsequent cycles are occasionally referred to as second, third, . . . , ninth, and tenth cycles. The cycle number of the PWM cycles is occasionally represented by i (i=1, 2, . . . , 9, and 10). The frequency (=1/Tc) of the PWM signal is called a carrier frequency.

Figure 4B:
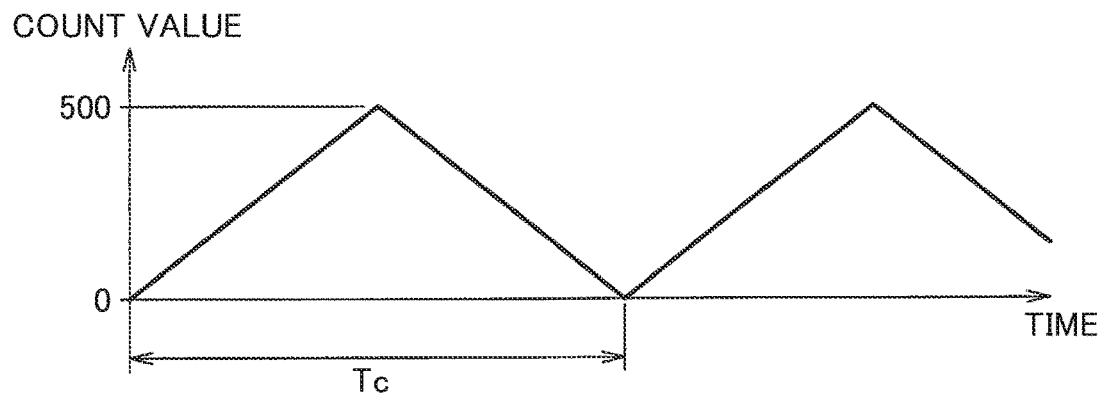
FIG. 4B is a waveform chart illustrating a carrier waveform.

A PWM waveform generation method according to the present embodiment will be described. The clocks of a PWM clock frequency generated by a clock generator (not illustrated) in the microcomputer 33 are counted up and counted down by a counter (not illustrated). The count value of the counter is indicated in FIG. 4B in which the horizontal axis represents the time and the vertical axis represents the count value. The count value is interpreted as an unsigned integer. The count value is occasionally called a carrier count. In the embodiment, the waveform in FIG. 4B is a carrier waveform. The carrier waveform is a triangular waveform. One cycle of the triangular waveform is equal to Tc. The frequency (carrier frequency) of the PWM signal is determined by the maximum value of the carrier waveform, that is, the maximum value of the count value. In the present embodiment, the PWM clock frequency is 100 [MHz], and the frequency (hereinafter referred to as the "PWM frequency") of the PWM signal is set to 100 [kHz]. Thus, the maximum value of the count value is 100,000,000÷100,000÷2=500. 100,000,000/100,000 is divided by 2 since the clocks are counted up and down.

Figure 4C:
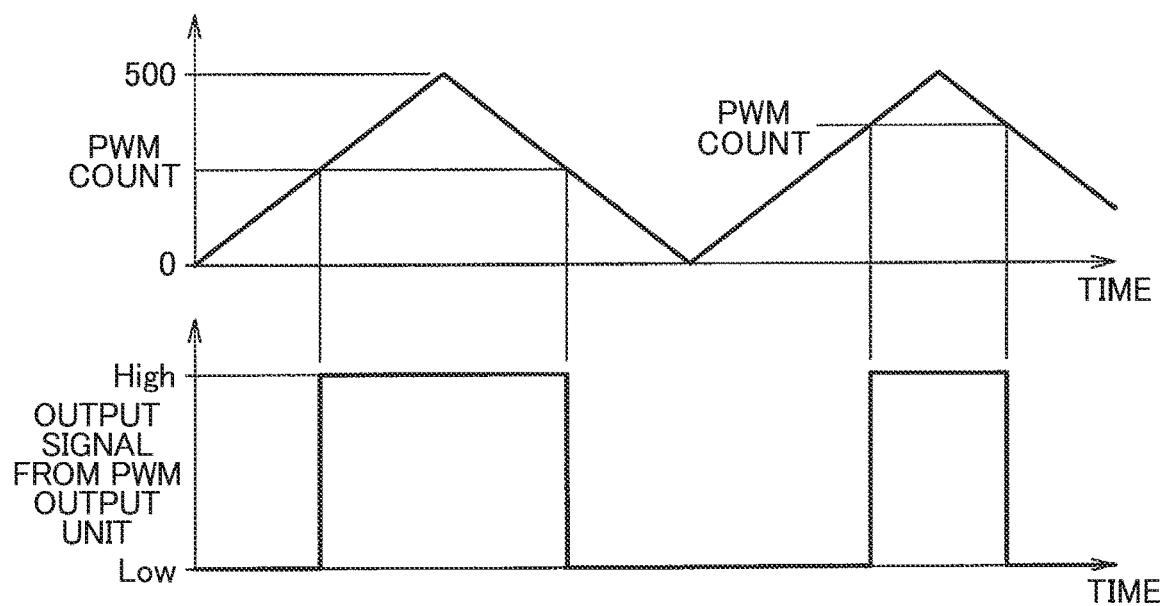
FIG. 4C is a schematic chart illustrating a PWM signal generation method.

As illustrated in FIG. 4C, the first PWM output unit 68 (see FIG. 3) compares a given PWM count and the count value of the counter, and outputs a High signal or a Low signal to the motor drive circuit 31. The first PWM output unit 68 outputs a High signal (or a Low signal) while the count value of the counter is equal to or more than the PWM count, and outputs a Low signal (or a High signal) otherwise, for example. The High signal and the Low signal are used as the PWM signal.

In the embodiment, the following two patterns are provided as variation patterns (on/off patterns) of the on/off state of the upper FETs and the lower FETs in the PWM cycle Tc.

First on/off pattern: a pattern in which the on/off state is varied, from the start of the carrier count, in the order of upper FET on state→lower FET on state→upper FET on state Second on/off pattern: a pattern in which the on/off state is varied, from the start of the carrier count, in the order of lower FET on state→upper FET on state→lower FET on state In the embodiment, the upper and lower FETs for two of U-phase, V-phase, and W-phase are controlled in accordance with one of the first on/off pattern and the second on/off pattern. The upper and lower FETs for the one remaining phase are controlled in accordance with the other pattern. One of the two phases, the upper and lower FETs for which are controlled in accordance with one of the on/off patterns, will be referred to as A-phase, and the other of two such phases will be referred to as B-phase. The one remaining phase, the upper and lower FETs for which are controlled in accordance with the other on/off pattern, will be occasionally referred to as C-phase.

The on/off patterns for respective phases are set in advance. In the embodiment, the upper and lower FETs for U-phase and W-phase are controlled in accordance with the first on/off pattern in the PWM cycles Tc. The upper and lower FETs for V-phase are controlled in accordance with the second on/off pattern in the PWM cycles Tc. Thus, in the embodiment, one of U-phase and W-phase corresponds to A-phase, the other corresponds to B-phase, and V-phase corresponds to C-phase.

Returning to FIG. 3, the rotational angle computation unit 70 computes a rotational angle θ (electrical angle) of the rotor of the electric motor 18 on the basis of an output signal from the rotational angle sensor 23 in each current control cycle Ta. The rotor rotational angle θ, which is computed by the rotational angle computation unit 70, is provided to the three-phase/two-phase conversion unit 69, the rotational speed computation unit 71, and the rotational angle estimation unit 72. In the embodiment, the rotor rotational angle θ is acquired (detected) at the timing at the middle of the current control cycle Ta.

The rotational speed computation unit 71 computes a rotational speed (angular velocity) ω of the rotor of the electric motor 18 by differentiating the rotor rotational angle θ, which is computed by the rotational angle computation unit 70, with respect to time. The rotational speed ω, which is computed by the rotational speed computation unit 71, is provided to the rotational angle estimation unit 72. The rotational angle estimation unit 72 estimates a rotor rotational angle $\theta_{m+1}$ at the middle of the next current control cycle Ta on the basis of the following formula (1) using the rotor rotational angle $\theta_{m-1}$ at the middle of the previous current control cycle Ta, which is acquired in the previous current control cycle Ta.

$$\theta_{m+1} = \theta_{m-1} + \omega \cdot 2Ta \quad (1)$$

Figure 5:
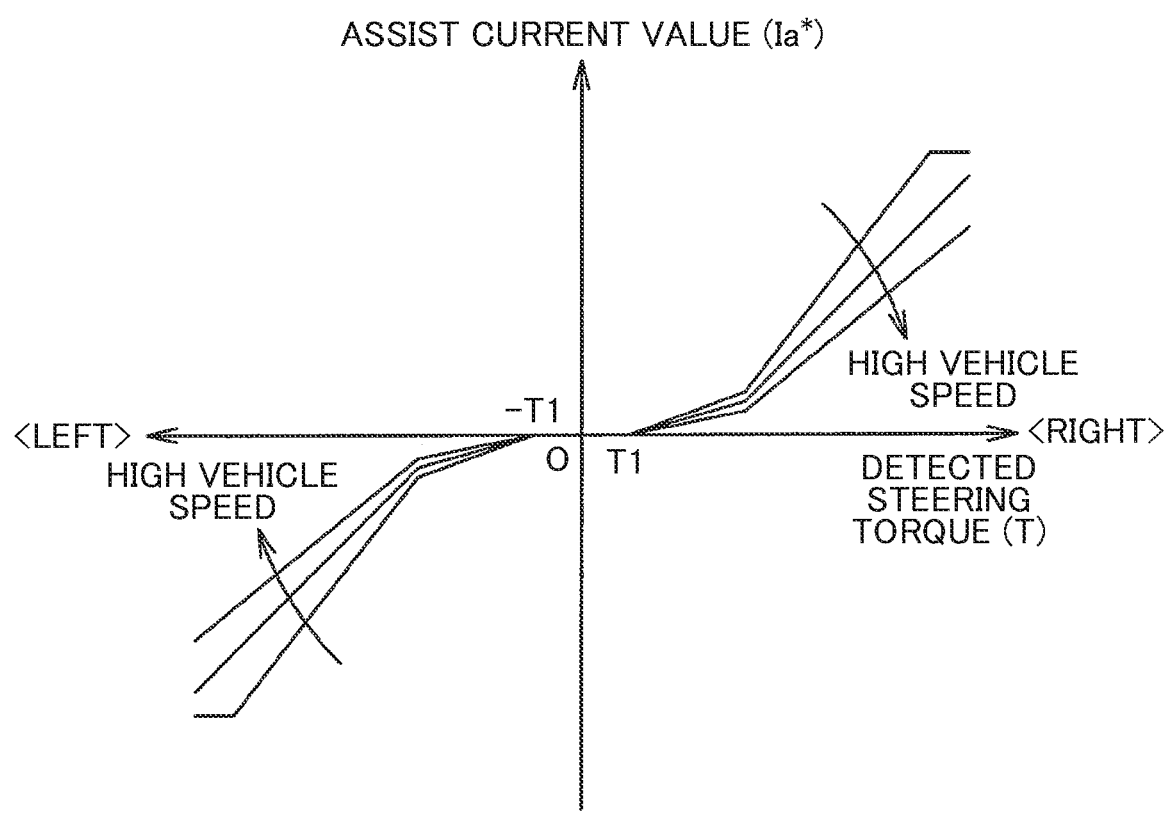
FIG. 5 is a graph illustrating an example of an assist current value Ia* set with respect to detected steering torque T.

The rotor rotational angle $\theta_{m+1}$ in the next current control cycle Ta, which is estimated by the rotational angle estimation unit 72, is provided to the two-phase/three-phase conversion unit 65. The assist current value setting unit 61 sets an assist current value Ia* in each current control cycle Ta on the basis of the detected steering torque T, which is detected by the torque sensor 11, and the vehicle speed V, which is detected by the vehicle speed sensor 24. An example of the assist current value Ia* which is set with respect to the detected steering torque T is illustrated in FIG. 5. The detected steering torque T has a positive value when the torque is applied to steer the vehicle to the right, and a negative value when the torque is applied to steer the vehicle to the left, for example. The assist current value Ia* has a positive value when the electric motor 18 should generate a steering assist force for steering the vehicle to the right, and a negative value when the electric motor 18 should generate a steering assist force for steering the vehicle to the left. The assist current value Ia* becomes positive when the detected steering torque T has a positive value, and becomes negative when the detected steering torque T has a negative value.

When the detected steering torque T has a very small value in the range (torque dead band) of −T1 to T1 (e.g. T1=0.4 N·m), the assist current value Ia* is set to zero. In the case where the detected steering torque T has a value outside the range of −T1 to T1, the assist current value Ia* is set such that the absolute value thereof becomes larger as the absolute value of the detected steering torque T becomes larger. The assist current value Ia* is also set such that the absolute value thereof becomes smaller as the vehicle speed V, which is detected by the vehicle speed sensor 24, becomes higher. Consequently, a large assist force is generated during low-speed travel, and a small assist force is generated during high-speed travel.

The current command value setting unit 62 sets the values of currents that should flow on the coordinate axes of a dq coordinate system as current command values on the basis of the assist current value Ia*, which is set by the assist current value setting unit 61. Specifically, the current command value setting unit 62 sets a d-axis current command value $I_d^*$ and a q-axis current command value $I_q^*$ (which will hereinafter be referred to collectively as "two-phase current command values $I_{dq}^*$"). Further specifically, the current command value setting unit 62 sets the q-axis current command value $I_q^*$ to the assist current value Ia*, which is set by the assist current value setting unit 61, and sets the d-axis current command value $I_d^*$ to zero. The two-phase current command values $I_{dq}^*$, which are set by the current command value setting unit 62, are provided to the current deviation computation unit 63.

The three-phase/two-phase conversion unit 69 first computes a U-phase current $I_U$, a V-phase current $I_V$, and a W-phase current $I_W$ (which will hereinafter be referred to collectively as "detected three-phase currents $I_{UVW}$") from the phase currents for two phases, which are detected by the current sensors 25 and 26. The three-phase/two-phase conversion unit 69 performs a coordinate conversion on the detected three-phase currents $I_{UVW}$ for the UVW coordinate system into detected two-phase currents $I_{dq}$ for the dq coordinate system. The detected two-phase currents $I_{dq}$ include a detected d-axis current $I_d$ and a detected q-axis current $I_q$. The rotor rotational angle θ, which is computed by the rotational angle computation unit 70, is used in the coordinate conversion.

The current deviation computation unit 63 computes a deviation of the detected d-axis current $I_d$ from the d-axis current command value $I_d^*$ and a deviation of the detected q-axis current $I_q$ from the q-axis current command value $I_q^*$. Such deviations are provided to the PI control unit 64. The PI control unit 64 performs a PI computation on the current deviations which are computed by the current deviation computation unit 63. Consequently, two-phase voltage command values $V_{dq}^*$ (a d-axis voltage command value $V_d^*$ and a q-axis voltage command value $V_q^*$) to be applied to the electric motor 18 are generated. The two-phase voltage command values $V_{dq}^*$ are provided to the two-phase/three-phase conversion unit 65.

The two-phase/three-phase conversion unit 65 performs a two-phase/three-phase conversion on the two-phase voltage command values $V_{dq}^*$, which are computed by the PI control unit 64 in the present current control cycle Ta, using an estimated rotational angle value $θ_{m+1}$ for the next current control cycle Ta, which is computed by the rotational angle estimation unit 72 in the present current control cycle Ta. Consequently, three-phase voltage command values $V_{UVW}^*$ for the next current control cycle Ta are computed. The three-phase voltage command values $V_{UVW}^*$ include a U-phase voltage command value $V_U^*$, a V-phase voltage command value $V_V^*$, and a W-phase voltage command value $V_W^*$. Consequently, three-phase voltage command values $V_{UVW}^*$ for the next current control cycle Ta are obtained.

The three-phase voltage command values $V_{UVW}^*$ for the next current control cycle Ta, which are obtained by the two-phase/three-phase conversion unit 65, are provided to the PWM duty computation unit 66. The PWM duty computation unit 66 generates a U-phase PWM count (PWM duty), a V-phase PWM count, and a W-phase PWM count for the next current control cycle Ta on the basis of the three-phase voltage command values $V_{UVW}^*$ for the next current control cycle Ta, and provides such counts to the common mode noise reduction unit 67.

A PWM count for U-phase, the upper and lower FETs for which are controlled in accordance with the first on/off pattern, is calculated as follows, for example. That is, the PWM duty computation unit 66 computes the U-phase PWM count Cu for a certain current control cycle Ta on the basis of the following formula (2) using the U-phase voltage command value $V_U^*$ for the relevant current control cycle Ta, which is obtained by the two-phase/three-phase conversion unit 65, and the maximum value (500 in this example) of the PWM count.

$$Cu = V_U^* \times (\text{maximum value of PWM count}/Vb) = V_U^* \times (500/Vb) \quad (2)$$

In the above formula (2), Vb is the power source voltage for the motor drive circuit 31 (output voltage of the power source 100). A PWM count Cw for W-phase, the upper and lower FETs for which are controlled in accordance with the first on/off pattern, can be computed by using the W-phase voltage command value $V_W^*$ in place of the U-phase voltage command value $V_U^*$ on the right side of the above formula (2).

A PWM count Cv for V-phase, the upper and lower FETs for which are controlled in accordance with the second on/off pattern, is calculated as follows. That is, the PWM duty computation unit 66 computes the V-phase PWM count Cv for a certain current control cycle Ta on the basis of the following formula (3) using the V-phase voltage command value $V_V^*$ for the relevant current control cycle Ta, which is obtained by the two-phase/three-phase conversion unit 65, and the maximum value (500 in this example) of the PWM count.

$$Cv = \text{maximum value of } PWM \text{ count} - \{V_v^* \times (\text{maximum value of } PWM \text{ count}/Vb)\} = 500 - \{V_v^* \times (500/Vb)\} \quad (3)$$

In the above formula (3), Vb is the power source voltage for the motor drive circuit 31 (output voltage of the power source 100). The common mode noise reduction unit 67 is provided to reduce common mode noise by canceling out a noise current generated by turning on and off of the switching element for a certain phase with a noise current generated by turning on and off of the switching element for a different phase. The common mode noise reduction unit 67 performs a process (noise reduction process) for reducing common mode noise on the basis of the U-phase PWM count Cu, the V-phase PWM count Cv, and the W-phase PWM count Cw for the next current control cycle Ta, which are provided from the PWM duty computation unit 66. Consequently, the U-phase PWM count, the V-phase PWM count, and the W-phase PWM count for each PWM cycle Tc in the next current control cycle Ta are obtained. Operation of the common mode noise reduction unit 67 will be discussed in detail later.

The U-phase PWM count, V-phase PWM count, and W-phase PWM count for each PWM cycle Tc in the next current control cycle Ta after being subjected to the noise reduction process, which is performed by the common mode noise reduction unit 67, are provided to the first PWM output unit 68. The first PWM output unit 68 stores the U-phase PWM count, V-phase PWM count, and W-phase PWM count for each PWM cycle Tc in the current control cycle Ta, which are provided from the common mode noise reduction unit 67, for a plurality of current control cycles. The first PWM output unit 68 generates a U-phase PWM signal, a V-phase PWM signal, and a W-phase PWM signal for each PWM cycle Tc in the present current control cycle Ta on the basis of the U-phase PWM count, V-phase PWM count, and W-phase PWM count for each PWM cycle Tc in the present current control cycle Ta, which are provided from the common mode noise reduction unit 67 in the previous current control cycle Ta, and supplies such signals to the motor drive circuit 31. Specifically, the first PWM output unit 68 generates, for each PWM cycle Tc in the present current control cycle Ta, a U-phase PWM signal, a V-phase PWM signal, and a W-phase PWM signal with a duty corresponding to the U-phase PWM count, V-phase PWM count, and W-phase PWM count, respectively, for each PWM cycle Tc in the relevant current control cycle Ta, and supplies such signals to the motor drive circuit 31.

The six FETs 111 to 116, which constitute the motor drive circuit 31, are controlled in accordance with the PWM signals, which are provided from the first PWM output unit 68. Consequently, a voltage corresponding to the three-phase voltage command values $V_{UVW}^*$ for each PWM cycle Tc is applied to the stator coils 18U, 18V, and 18W for respective phases of the electric motor 18. The current deviation computation unit 63 and the PI control unit 64 constitute a current feedback control unit. The current feedback control unit operates to control the motor current which flows through the electric motor 18 so as to approximate the two-phase current command values $I_{dq}^*$ which are set by the current command value setting unit 62.

The common mode noise reduction unit 67 will be described in detail below. First, the basic idea of the common mode noise reduction which is performed by the common mode noise reduction unit 67 will be described with reference to FIG. 6. In the case where the waveform of an output voltage (hereinafter referred to as a first phase voltage) for a certain one of the three phases is as indicated by (a) in FIG. 6, a current that flows through the stray capacitance C1 (see FIG. 2), which is present between the electric motor 18 and the frame ground, because of the first phase voltage is as indicated by (c) in FIG. 6. That is, a current in the − direction flows through the stray capacitance C1 at the time of fall t1 of the first phase voltage, and a current in the + direction flows through the stray capacitance C1 at the time of rise t2 of the first phase voltage.

Figure 6:
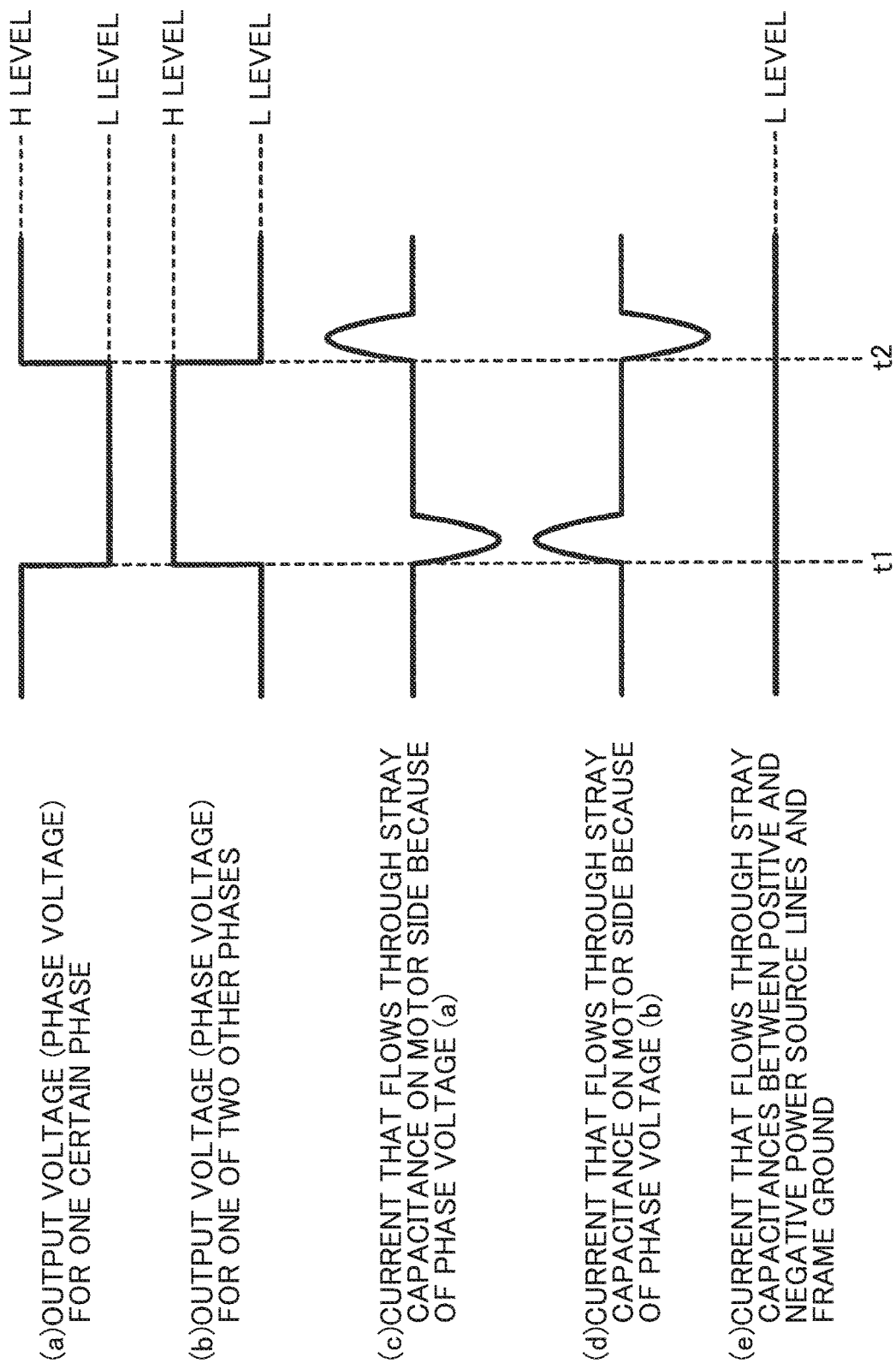
FIG. 6 illustrates the basic idea of a common mode noise reduction performed by a common mode noise reduction unit.

Thus, as indicated by (b) in FIG. 6, the waveform of an output voltage (hereinafter referred to as a "second phase voltage") for one of the two other phases is determined as a waveform obtained by inverting the waveform of the first phase voltage indicated by (a) in FIG. 6. Then, the current which flows through the stray capacitance C1 (see FIG. 2), which is present between the electric motor 18 and the frame ground, because of the second phase voltage is as indicated by (d) in FIG. 6. That is, a current in the + direction flows through the stray capacitance C1 at the time of rise t1 of the second phase voltage. A current in the − direction flows through the stray capacitance C1 at the time of fall t2 of the second phase voltage. Thus, the current which flows through the stray capacitance C1 because of the first phase voltage and the current which flows through the stray capacitance C1 because of the second phase voltage cancel out each other at each of the time t1 and the time t2. Therefore, as indicated by (e) in FIG. 6, the currents which flow through the stray capacitances C2 and C3 (see FIG. 2), which are present between the positive and negative power source lines and the frame ground, respectively, are reduced.

Figure 7:
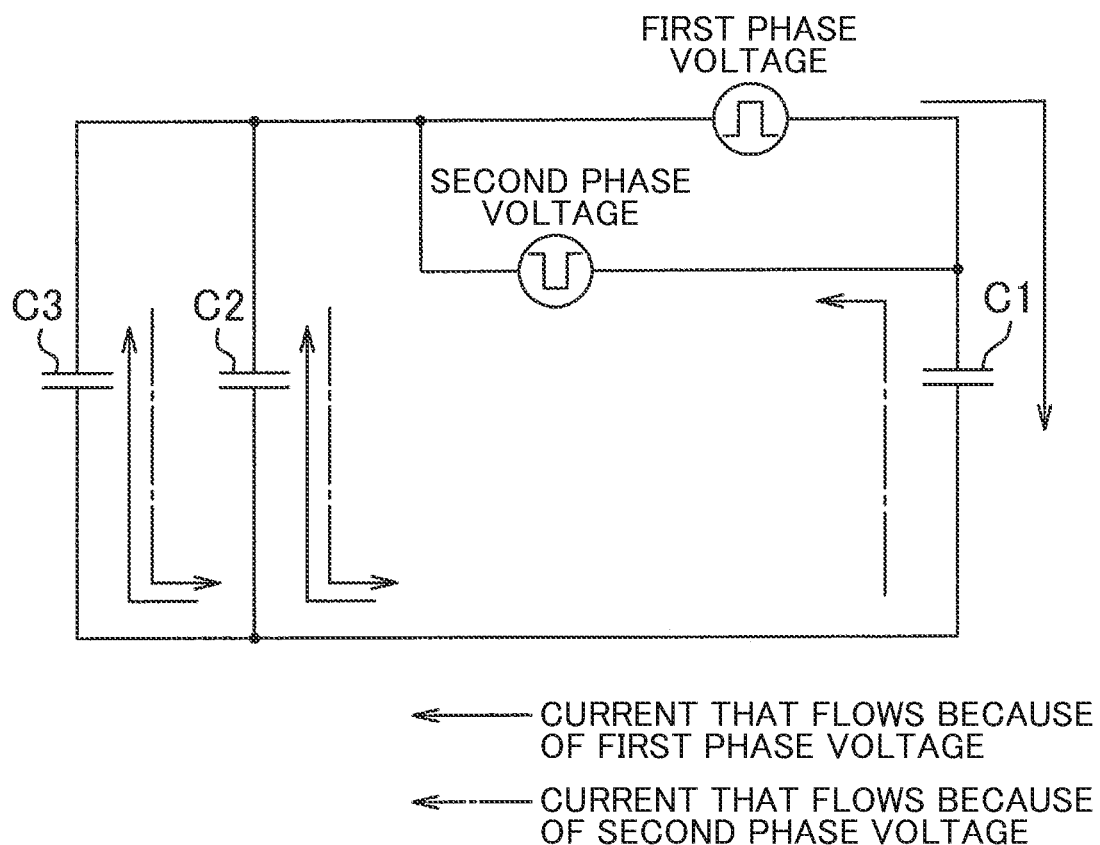
FIG. 7 is a circuit diagram illustrating an equivalent circuit that places a focus on common mode noise currents.

FIG. 7 illustrates an equivalent circuit that places a focus on common mode noise currents. The first phase voltage and the second phase voltage can be considered as noise generation sources. The positive and negative electrodes of the power source 100 can be considered as being short-circuited for alternating currents such as the common mode noise currents. In FIG. 7, common mode noise currents flow as indicated by the continuous arrows when the first phase voltage rises. Common mode noise currents flow as indicated by the long dashed short dashed arrows when the second phase voltage falls. Thus, the common mode noise currents which flow through the stray capacitances C2 and C3 are opposite in direction to each other, and thus cancel out each other. As a result, the total common mode noise currents are reduced.

The common mode noise reduction unit 67 sets a PWM count in units of PWM cycles such that a current that flows through a stray capacitance because of a phase voltage for any one of the three phases is canceled out with a current that flows through the stray capacitance because of a phase voltage for one of the two other phases in each PWM cycle in a current control cycle. It should be noted, however, that the common mode noise reduction unit 67 sets a PWM count for each PWM cycle Tc such that the total value of PWM counts for each phase in units of PWM cycles in the current control cycle Ta is a value that matches a PWM count in units of current control cycles for the corresponding phase. In the embodiment, the value which matches a PWM count in units of current control cycles for the corresponding phase is a value obtained by multiplying a PWM count in units of current control cycles for the corresponding phase by 10.

Figure 8:
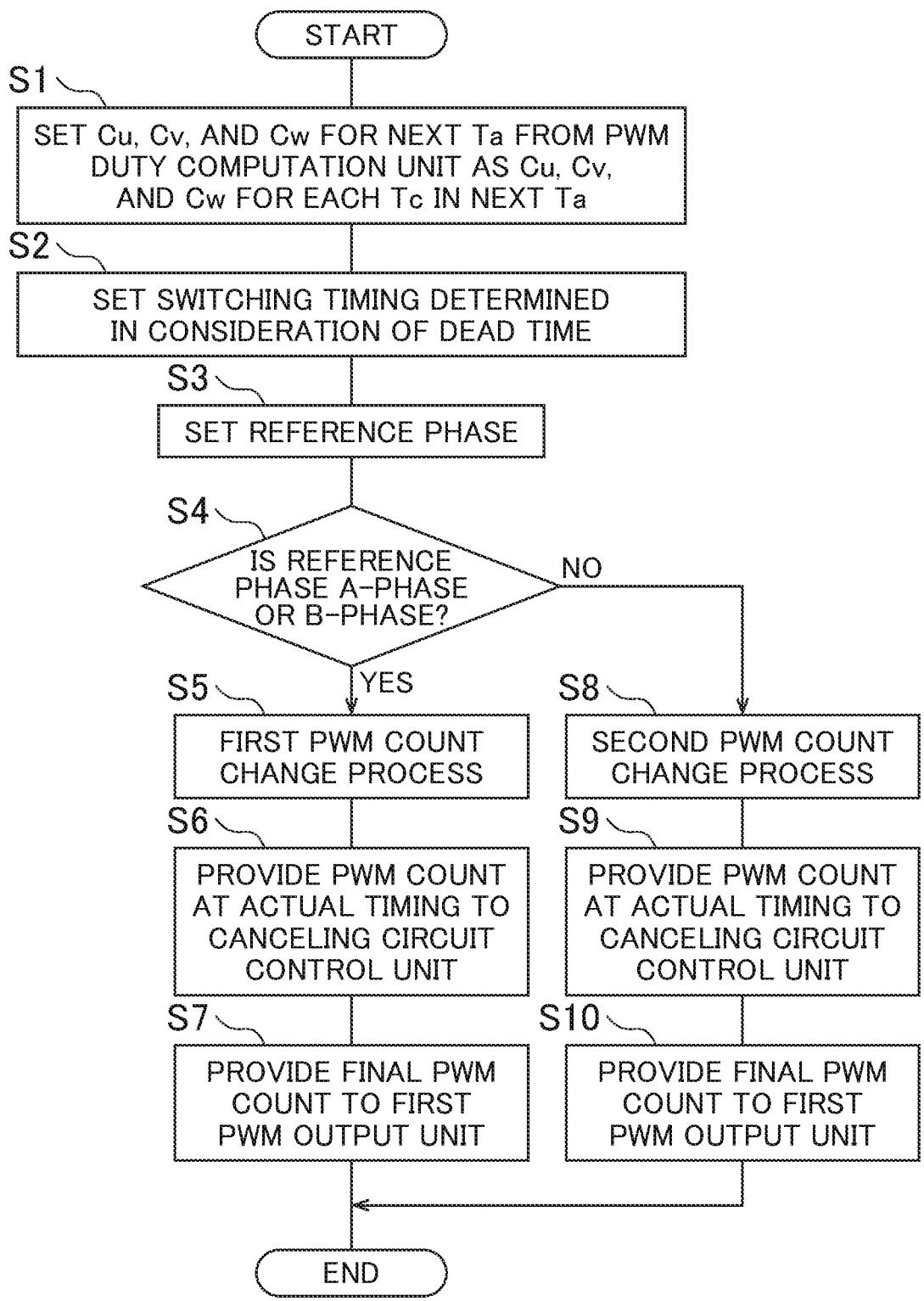
FIG. 8 is a flowchart illustrating an example of operation of the common mode noise reduction unit.

FIG. 8 is a flowchart illustrating an example of operation of the common mode noise reduction unit. The common mode noise reduction unit 67 (see FIG. 3) first sets the U-phase, V-phase, and W-phase PWM counts Cu, Cv, and Cw for the next current control cycle Ta, which are provided from the PWM duty computation unit 66, as the U-phase, V-phase, and W-phase PWM counts Cu, Cv, and Cw for each PWM cycle Tc in the next current control cycle Ta (step S1).

FIG. 11A is a schematic table illustrating an example of the U-phase, V-phase, and W-phase PWM counts Cu, Cv, and Cw in each PWM cycle Tc in the current control cycle Ta set in step S1. Next, the common mode noise reduction unit 67 sets a switching timing determined in consideration of the dead time for each phase (step S2).

Figure 9:
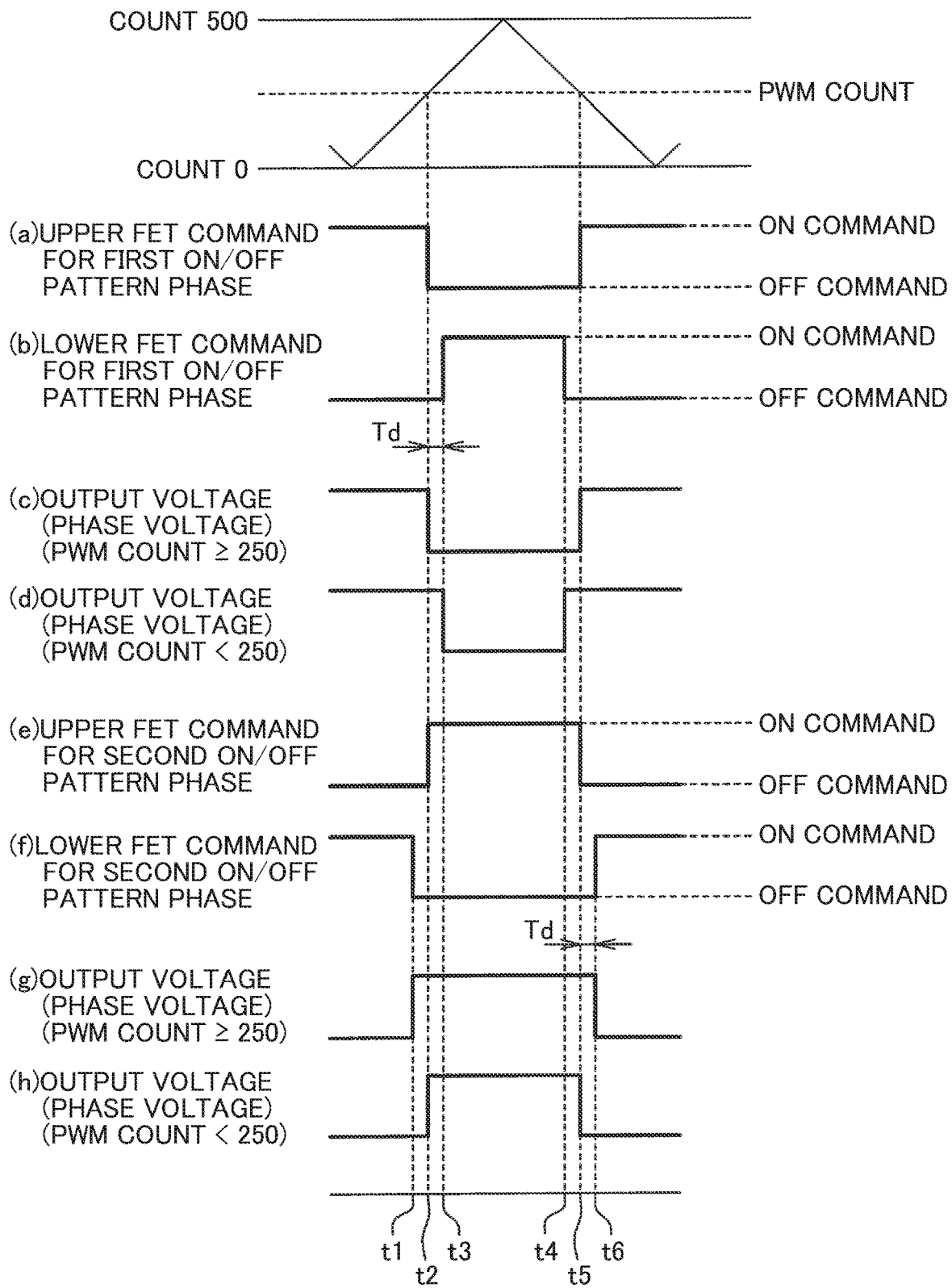
FIG. 9 is a schematic chart mainly illustrating the relationship between a PWM count and an upper FET command and a lower FET command for each phase.

FIG. 9 is a schematic chart mainly illustrating the relationship between a PWM count and an upper FET command and a lower FET command for each phase. In other words, FIG. 9 is a schematic chart illustrating an example of operation of the first PWM output unit 68 (see FIG. 3) for each phase. In the embodiment, as discussed earlier, the carrier waveform is a triangular waveform, and the value that can be output as the PWM count is set to 0 to 500. In the embodiment, the count value corresponding to the dead time is set to 10.

An upper FET command and a lower FET command for U-phase and W-phase (first on/off pattern phases), the upper and lower FETs for which are controlled in accordance with the first on/off pattern, will be described. The switching timing of the upper FET for the first on/off pattern phases is set such that the upper FET command for the first on/off pattern phases is an off command when the carrier count is larger than the PWM count for the first on/off pattern phases. That is, as indicated by (a) in FIG. 9, the upper FET command for the first on/off pattern phases is varied from an on command to an off command when the carrier count becomes equal to the PWM count for the first on/off pattern phases (time t2) while the carrier count is counting up. Then, the upper FET command for the first on/off pattern phases is varied from an off command to an on command when the carrier count becomes equal to the PWM count for the first on/off pattern phases (time t5) while the carrier count is counting down.

As indicated by (b) in FIG. 9, when a dead time Td elapses (time t3) from the time t2, the lower FET command for the first on/off pattern phases is varied from an off command to an on command. Then, the lower FET command for the first on/off pattern phases is varied from an on command to an off command at the time (time t4) the dead time Td earlier than the time t5. An upper FET command and a lower FET command for V-phase (second on/off pattern phase), the upper and lower FETs for which are controlled in accordance with the second on/off pattern, will be described. The switching timing of the upper FET for the second on/off pattern phase is set such that the upper FET command for the second on/off pattern phase is an on command when the carrier count is larger than the PWM count for the second on/off pattern phase. That is, as indicated by (e) in FIG. 9, the upper FET command for the second on/off pattern phase is varied from an off command to an on command when the carrier count becomes equal to the PWM count for the second on/off pattern phase (time t2) while the carrier count is counting up. Then, the upper FET command for the second on/off pattern phase is varied from an on command to an off command when the carrier count becomes equal to the PWM count for the second on/off pattern phase (time t5) while the carrier count is counting down.

As indicated by (f) in FIG. 9, the lower FET command for the second on/off pattern phase is varied from an on command to an off command at the time (time t1) the dead time Td earlier than the time t2. When the dead time Td elapses (time t6) from the time t5, the lower FET command for the second on/off pattern phase is varied from an off command to an on command. A phase voltage for a certain phase during a dead time period will be described with reference to FIGS. 10A and 10B. Here, U-phase will be described as an example. The same description also applies to the two other phases.

Figure 10A:
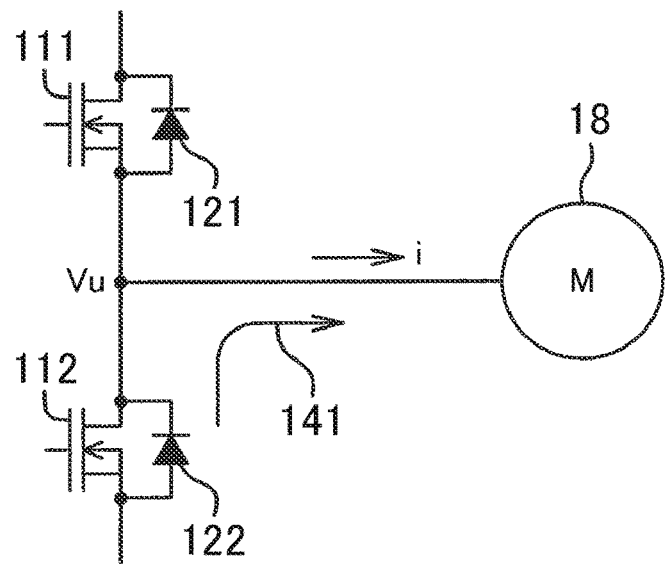
FIG. 10A illustrates a current path during a dead time period with a current flowing from the point of connection between an upper FET and a lower FET toward an electric motor.

As indicated by the symbol "i" in FIG. 10A, in a state in which a current is flowing from the point of connection between the upper FET 111 and the lower FET 112 toward the electric motor 18, a current flows through the diode 122, which is connected in inverse parallel with the lower FET 112, as indicated by an arrow 141 during a dead time period. Thus, the phase voltage Vu is at L level during the dead time period. Therefore, the period during which the phase voltage Vu is at L level is the same as an off period of the upper FET 111.

Figure 10B:
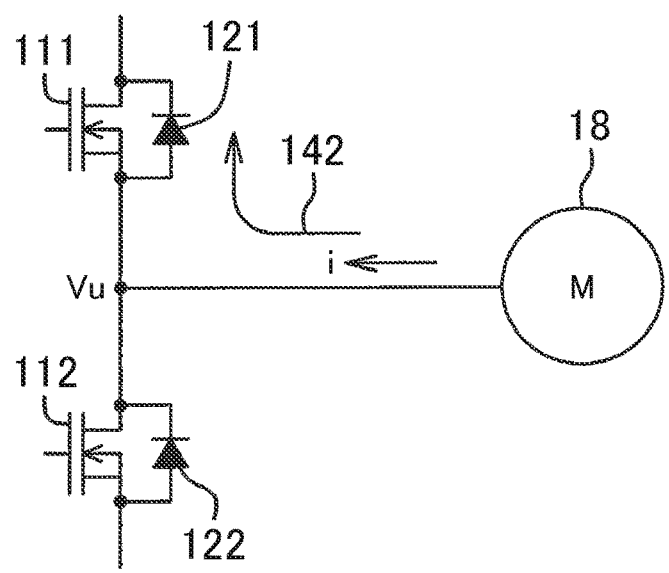
FIG. 10B illustrates a current path during a dead time period with a current flowing from the electric motor toward the point of connection between the upper FET and the lower FET.

As indicated by the symbol "i" in FIG. 10B, in a state in which a current is flowing from the electric motor 18 toward the point of connection between the upper FET 111 and the lower FET 112, on the other hand, a current flows through the diode 121, which is connected in inverse parallel with the upper FET 111, as indicated by an arrow 142 during a dead time period. Thus, the phase voltage Vu is at H level during the dead time period. Therefore, the period during which the phase voltage Vu is at L level is shorter than an off period of the upper FET 111. In other words, the period during which the phase voltage Vu is at H level is longer than an on period of the upper FET 111.

In the case where the PWM count is equal to or more than half the maximum value of the PWM count (equal to or more than 250) for U-phase and W-phase which are the first on/off pattern phases, the on time of the upper FETs is longer than that for a case where the PWM count is not equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count is equal to or more than 250. Therefore, it is considered that the phase voltage is at L level during a dead time period. Thus, in this case, it is considered that the phase voltage is varied as indicated by (c) in FIG. 9. Therefore, the level variation timing of the phase voltage and the switching timing of the upper FET coincide with each other.

In the case where the PWM count is not equal to or more than half the maximum value of the PWM count (not equal to or more than 250) for U-phase and W-phase, on the other hand, the on time of the upper FETs is shorter than that for a case where the PWM count is equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count is not equal to or more than 250. Therefore, it is considered that the phase voltage is at H level during a dead time period. Thus, in this case, it is considered that the phase voltage is varied as indicated by (d) in FIG. 9, and thus the level variation timing of the phase voltage and the switching timing of the upper FET do not coincide with each other. A virtual PWM count (switching timing determined in consideration of the dead time) at which the switching timing of the upper FET coincides with the level variation timing of the phase voltage has a value obtained by adding a count value (in the embodiment, "10") corresponding to the dead time to the actual PWM count.

In the case where the PWM count is equal to or more than half the maximum value of the PWM count (equal to or more than 250) for V-phase which is the second on/off pattern phase, the on time of the upper FETs is shorter than that for a case where the PWM count is not equal to or more than half the maximum value of the PWM count. Thus, in the embodiment, for convenience of description, it is considered that a current is flowing from the electric motor 18 toward the point of connection between the upper FET and the lower FET (as illustrated in FIG. 10B) in the case where the PWM count is equal to or more than 250. Therefore, it is considered that the phase voltage is at H level during a dead time period. Thus, in this case, it is considered that the phase voltage is varied as indicated by (g) in FIG. 9. Therefore, the level variation timing of the phase voltage and the switching timing of the upper FET do not coincide with each other. A virtual PWM count (switching timing determined in consideration of the dead time) at which the switching timing of the upper FET coincides with the level variation timing of the phase voltage has a value obtained by subtracting a count value (in the embodiment, "10") corresponding to the dead time from the actual PWM count.

In the case where the PWM count is not equal to or more than half the maximum value of the PWM count (not equal to or more than 250) for V-phase, on the other hand, the on time of the upper FET is longer than that for a case where the PWM count is equal to or more than half the maximum value of the PWM count. Thus, in the embodiment, for convenience of description, it is considered that a current is flowing from the point of connection between the upper FET and the lower FET toward the electric motor 18 (as illustrated in FIG. 10A) in the case where the PWM count is not equal to or more than 250. Therefore, it is considered that the phase voltage is at L level during a dead time period. Thus, in this case, it is considered that the phase voltage is varied as indicated by (h) in FIG. 9. Therefore, the level variation timing of the phase voltage and the switching timing of the upper FET coincide with each other.

In the embodiment, for convenience of description, the direction of the phase current for each phase is estimated on the basis of whether or not the PWM count is equal to or more than half the maximum value of the PWM count. However, the direction of the phase current may be estimated on the basis of a detected value of the phase current. In step S2, for each PWM count in the PWM cycle Tc for each phase set in step S1, the common mode noise reduction unit 67 computes a PWM count (PWM count at the actual timing) corresponding to the level variation timing of the phase voltage for the relevant phase.

Specifically, for a PWM count that is equal to or more than 250, of the U-phase and W-phase PWM counts Cu and Cw for each PWM cycle Tc in the next current control cycle Ta, the common mode noise reduction unit 67 sets the value of the PWM count, as it is, as the PWM count corresponding to the level variation timing of the phase voltage for the relevant phase. For a PWM count that is not equal to or more than 250, of the U-phase and W-phase PWM counts Cu and Cw, the common mode noise reduction unit 67 sets a value obtained by adding a count value (in the embodiment, "10") corresponding to the dead time to the value of the PWM count as the PWM count corresponding to the level variation timing of the phase voltage for the relevant phase.

For a PWM count that is equal to or more than 250, of the V-phase PWM counts Cv for each PWM cycle Tc in the next current control cycle Ta, the common mode noise reduction unit 67 sets a value obtained by subtracting a count value (in the embodiment, "10") corresponding to the dead time from the value of the PWM count as the PWM count corresponding to the level variation timing of the phase voltage for the relevant phase. For a PWM count that is not equal to or more than 250, of the V-phase PWM counts Cv, the common mode noise reduction unit 67 sets the value of the PWM count, as it is, as the PWM count corresponding to the level variation timing of the phase voltage for the relevant phase.

In the case where the PWM count in units of PWM cycles for each phase set in step S1 is as indicated in FIG. 11A, the PWM count in units of PWM cycles for each phase set in step S2 is as indicated in FIG. 11B. When FIGS. 11A and 11B are compared with each other, it is seen that the PWM count Cv for V-phase is varied from 300 to 290, and that the PWM count Cw for W-phase is varied from 100 to 110.

Next, the common mode noise reduction unit 67 sets, of the respective phases, a phase that has a PWM count that is the closest to the maximum value (in the embodiment, "500") or the minimum value (in the embodiment, "0") of the PWM count, of the PWM counts which are set in the process in step S2, as a reference phase (step S3). In the example in FIG. 11B, the PWM count Cu (Cu=400) for U-phase (corresponding to A-phase or B-phase) is the closest to 500 or 0, and thus U-phase is set as the reference phase. In the embodiment, in the case where one of A-phase and B-phase is set as the reference phase, one of the phases that is set as the reference phase is referred to as A-phase, and the other is referred to as B-phase. In the embodiment, in the case where U-phase is set as the reference phase as discussed earlier, U-phase is determined as A-phase, and W-phase is determined as B-phase.

Next, the common mode noise reduction unit 67 determines whether or not the reference phase is A-phase or B-phase (step S4). In the example in FIG. 11B, U-phase is set as the reference phase, and thus it is determined that the reference phase is A-phase or B-phase. In the case where it is determined that the reference phase is A-phase or B-phase (step S4: YES), the common mode noise reduction unit 67 performs a first PWM count change process (step S5).

The first PWM count change process will be described in detail using FIGS. 11A and 11B as an example. In the example in FIG. 11B, as discussed earlier, U-phase is set as the reference phase. The common mode noise reduction unit 67 assigns C-phase (V-phase) as a first count change target phase, the PWM count for which is to be changed in order to cancel out a noise current for A-phase (U-phase) which is the reference phase. The common mode noise reduction unit 67 assigns one (in the example, B-phase (W-phase)) of A-phase and B-phase that is not the reference phase as a second count change target phase, the PWM count for which is to be changed in order to cancel out a noise current for C-phase (V-phase) after a count change.

The common mode noise reduction unit 67 sets an amplitude for canceling out a noise current for the count change target phases (in the example, C-phase (V-phase) and B-phase (W-phase)). In order to change a PWM count value for a certain count change target phase such that the total value of PWM count values in the current control cycle Ta is not changed, it is only necessary that one of an amplitude that matches a first amplitude pattern indicated in FIG. 12A and an amplitude that matches a second amplitude pattern indicated in FIG. 12A, for example, should be added to the PWM count value for the relevant count change target phase.

The symbol "x" in FIG. 12A indicates an amplitude prescription value that prescribes the absolute value of the amplitude. In the embodiment, the first amplitude pattern is assigned to the first count change target phase (C-phase (V-phase)). The second amplitude pattern is assigned to the second count change target phase (B-phase (W-phase)). The common mode noise reduction unit 67 computes the amplitude prescription value x for each of C-phase (V-phase) as the first count change target phase and B-phase (W-phase) as the second count change target phase on the basis of the PWM count, which is set in the process in step S2, as follows. The common mode noise reduction unit 67 computes the absolute value of the difference between the PWM count for C-phase (V-phase) and the PWM count for the reference phase (A-phase (U-phase)), a noise current for which should be canceled out, as the amplitude prescription value x for C-phase (V-phase).

In the example, the amplitude prescription value x for C-phase (V-phase) is 110 (=400−290). Consequently, a first computation value obtained by adding the amplitude prescription value x for C-phase (V-phase) to the PWM count for C-phase (V-phase) is 400 (=290+110). A second computation value obtained by subtracting the amplitude prescription value x for C-phase (V-phase) from the PWM count for C-phase (V-phase) is determined as 180 (=290−110).

The common mode noise reduction unit 67 computes the absolute value of the difference between one (in the example, the second computation value) of the first computation value and the second computation value that is different from the PWM count for A-phase (U-phase), which is the reference phase, and the PWM count for B-phase (W-phase) as the amplitude prescription value x for B-phase (W-phase). In the example, the amplitude prescription value x for B-phase (W-phase) is determined as 70 (=180−110).

The common mode noise reduction unit 67 sets an amplitude in each PWM cycle Tc for each count change target phase on the basis of the amplitude prescription value x for each count change target phase computed in this manner and the amplitude pattern which is applied to the relevant phase. The amplitudes in each PWM cycle Tc for C-phase (V-phase) and B-phase (W-phase), which are set on the basis of the PWM counts in units of PWM cycles for each phase indicated in FIG. 11B, are indicated in FIG. 12B.

Next, the common mode noise reduction unit 67 calculates the final PWM count for each phase for each PWM cycle Tc in the next current control cycle Ta. Specifically, the common mode noise reduction unit 67 changes the PWM count for the count change target phase, which is set in step S1, on the basis of the amplitude for the count change target phase. More specifically, the common mode noise reduction unit 67 changes the PWM count for the count change target phase in each PWM cycle Tc by adding the amplitude for the count change target phase to the PWM count for the count change target phase in each PWM cycle Tc which is set in step S1. A PWM count obtained by changing the count change target phase of the PWM count which is set in step S1 is used as the final PWM count.

Next, the common mode noise reduction unit 67 calculates the PWM count (PWM count at the actual timing) corresponding to the level variation timing of each phase voltage that matches the final PWM count. Specifically, the common mode noise reduction unit 67 changes the PWM count for the count change target phase, which is set in step S2, on the basis of the amplitude for the count change target phase. More specifically, the common mode noise reduction unit 67 adds the amplitude for the count change target phase to the PWM count for the count change target phase in each PWM cycle Tc which is set in step S2. Consequently, the PWM counts for the count change target phases in each PWM cycle Tc are changed. A PWM count obtained by changing the count change target phase of the PWM count which is set in step S2 is used as the PWM count at the actual timing. Consequently, the first PWM count change process is ended.

Next, the common mode noise reduction unit 67 provides the PWM count at the actual timing, which is obtained through the first PWM count change process, to the canceling circuit control unit 52 (step S6).

In addition, the common mode noise reduction unit 67 provides the final PWM count, which is obtained through the first PWM count change process, to the first PWM output unit 68 (step S7). Then, the common mode noise reduction unit 67 ends the process in the present current control cycle Ta.

In the case where the PWM count in units of PWM cycles for each phase, which is set in step S1, has a value indicated in FIG. 11A and the amplitudes for the count change target phases have values indicated in FIG. 12B, the final PWM count in units of PWM cycles for each phase is as indicated in FIG. 12C. The PWM count at the actual timing is as indicated in FIG. 12D. As indicated in FIG. 12D, the PWM count for U-phase (first on/off pattern phase) in odd-numbered PWM cycles Tc coincides with the PWM count for V-phase (second on/off pattern phase). Therefore, in the odd-numbered PWM cycles Tc, a noise current that flows through the stray capacitance C1 (see FIG. 2) on the electric motor 18 side because of the phase voltage for U-phase is canceled out with a noise current that flows through the stray capacitance C1 on the electric motor 18 side because of the phase voltage for V-phase.

The PWM count for V-phase (second on/off pattern phase) in even-numbered PWM cycles Tc coincides with the PWM count for W-phase (first on/off pattern phase). Therefore, in the even-numbered PWM cycles Tc, a noise current that flows through the stray capacitance C1 (see FIG. 2) on the electric motor 18 side because of the phase voltage for V-phase is canceled out with a noise current that flows through the stray capacitance C1 on the electric motor 18 side because of the phase voltage for W-phase. Consequently, common mode noise is reduced.

It should be noted, however, that in the odd-numbered PWM cycles Tc, a noise current that flows through the stray capacitance C1 because of the phase voltage for W-phase (first on/off pattern phase) is not canceled out with a noise current that flows through the stray capacitance C1 because of the phase voltage for a different phase. In the even-numbered PWM cycles Tc, in addition, a noise current that flows through the stray capacitance C1 because of the phase voltage for U-phase (first on/off pattern phase) is not canceled out with a noise current that flows through the stray capacitance C1 because of the phase voltage for a different phase. Common mode noise based on such noise currents that are not canceled out is reduced by the noise canceling circuit 32 as discussed later.

In the case where it is determined in step S4 that the reference phase is C-phase (step S4: NO), the common mode noise reduction unit 67 performs a second PWM count change process (step S8). In the embodiment, in the case where C-phase is set as the reference phase, one of the two phases other than C-phase is referred to as A-phase, and the other is referred to as B-phase. In the embodiment, U-phase, of U-phase and W-phase which are the two phases other than C-phase, is referred to as A-phase, and W-phase is referred to as B-phase.

The second PWM count change process will be described in detail with reference to FIGS. 13A and 13B. FIG. 13A is a schematic table illustrating an example of the U-phase, V-phase, and W-phase PWM counts Cu, Cv, and Cw in each PWM cycle Tc in the current control cycle Ta set in step S1. In the case where the PWM count in each PWM cycle for each phase set in step S1 is as indicated in FIG. 13A, the PWM count in each PWM cycle for each phase set in step S2 is as indicated in FIG. 13B. From a comparison between FIGS. 13A and 13B, it is seen that the PWM count Cv for V-phase (C-phase) is varied from 400 to 390. In the example in FIG. 13B, the PWM count Cu (Cu=390) for V-phase (corresponding to C-phase) is the closest to 500 or 0, and thus V-phase is set as the reference phase in step S3. Therefore, it is determined in step S4 that the reference phase is C-phase.

In the second PWM count change process, the common mode noise reduction unit 67 first assigns two phases, namely A-phase (U-phase) and B-phase (W-phase), as count change target phases, the PWM count for which is to be changed in order to cancel out a noise current for C-phase (V-phase) which is the reference phase. Hereinafter, A-phase (U-phase) will be referred to as a first count change target phase, and B-phase (W-phase) will be referred to as a second count change target phase.

Then, the common mode noise reduction unit 67 sets an amplitude for canceling out a noise current for the count change target phases (in the example, A-phase (U-phase) and B-phase (W-phase)). In order to change a PWM count value for a certain count change target phase such that the total value of PWM count values in the current control cycle Ta is not changed, it is only necessary that one of an amplitude that matches a first amplitude pattern indicated in FIG. 14A and an amplitude that matches a second amplitude pattern indicated in FIG. 14A, for example, should be added to the PWM count value for the relevant count change target phase. The symbol "x" in FIG. 14A indicates an amplitude prescription value that prescribes the absolute value of the amplitude. In the embodiment, the first amplitude pattern is assigned to A-phase (U-phase) which is the first count change target phase. The second amplitude pattern is assigned to B-phase (W-phase) which is the second count change target phase.

The common mode noise reduction unit 67 computes the amplitude prescription value x for each of A-phase (U-phase) as the first count change target phase and B-phase (W-phase) as the second count change target phase on the basis of the PWM count, which is set in the process in step S2, as follows. The common mode noise reduction unit 67 computes the absolute value of the difference between the PWM count for A-phase (U-phase) and the PWM count for C-phase (V-phase), a noise current for which should be canceled out, as the amplitude prescription value x for A-phase (U-phase). In the example, the amplitude prescription value x for A-phase (U-phase) is 30 (=390−360). The common mode noise reduction unit 67 computes the absolute value of the difference between the PWM count for B-phase (W-phase) and the PWM count for C-phase (V-phase), a noise current for which should be canceled out, as the amplitude prescription value x for B-phase (W-phase). In the example, the amplitude prescription value x for B-phase (W-phase) is 110 (=390−280).

The common mode noise reduction unit 67 sets an amplitude in each PWM cycle Tc for each count change target phase on the basis of the amplitude prescription value x for each count change target phase computed in this manner and the amplitude pattern which is applied to the relevant phase. The amplitudes in each PWM cycle Tc for U-phase and W-phase, which are set on the basis of the PWM counts in units of PWM cycles for each phase indicated in FIG. 13B, are indicated in FIG. 14B.

Next, the common mode noise reduction unit 67 calculates the final PWM count for each phase for each PWM cycle Tc in the next current control cycle Ta. Specifically, the common mode noise reduction unit 67 changes the PWM count for the count change target phase for each PWM cycle Tc in the next current control cycle Ta, which is set in step S1, on the basis of the amplitude for the count change target phase. More specifically, the common mode noise reduction unit 67 changes the PWM count for the count change target phase in each PWM cycle Tc by adding the amplitude for the count change target phase to the PWM count for the count change target phase in each PWM cycle Tc which is set in step S1. A PWM count obtained by changing the count change target phase of the PWM count which is set in step S1 is used as the final PWM count.

Next, the common mode noise reduction unit 67 calculates the PWM count (PWM count at the actual timing) corresponding to the level variation timing of each phase voltage that matches the final PWM count. Specifically, the common mode noise reduction unit 67 changes the PWM count for the count change target phase, which is set in step S2, on the basis of the amplitude for the count change target phase. More specifically, the common mode noise reduction unit 67 adds the amplitude for the count change target phase to the PWM count for the count change target phase in each PWM cycle Tc which is set in step S2. Consequently, the PWM counts for the count change target phases in each PWM cycle Tc are changed. A PWM count obtained by changing the count change target phase of the PWM count which is set in step S2 is used as the PWM count at the actual timing. Consequently, the second PWM count change process is ended.

Next, the common mode noise reduction unit 67 provides the PWM count at the actual timing, which is obtained through the second PWM count change process, to the canceling circuit control unit 52 (step S9).

In addition, the common mode noise reduction unit 67 provides the final PWM count, which is obtained through the second PWM count change process, to the first PWM output unit 68 (step S10). Then, the common mode noise reduction unit 67 ends the process in the present current control cycle Ta.

In the case where the PWM count in units of PWM cycles for each phase, which is set in step S1, has a value indicated in FIG. 13A and the amplitudes for the count change target phases have values indicated in FIG. 14B, the final PWM count in units of PWM cycles for each phase is as indicated in FIG. 14C. In addition, the PWM count at the actual timing is as indicated in FIG. 14D. As indicated in FIG. 14D, the PWM count for V-phase (second on/off pattern phase) in odd-numbered PWM cycles Tc coincides with the PWM count for U-phase (first on/off pattern phase). Therefore, in the odd-numbered PWM cycles Tc, a noise current that flows through the stray capacitance C1 (see FIG. 2) on the electric motor 18 side because of the phase voltage for V-phase is canceled out with a noise current that flows through the stray capacitance C1 on the electric motor 18 side because of the phase voltage for U-phase.

The PWM count for V-phase (second on/off pattern phase) in even-numbered PWM cycles Tc coincides with the PWM count for W-phase (first on/off pattern phase). Therefore, in the even-numbered PWM cycles Tc, a noise current that flows through the stray capacitance C1 (see FIG. 2) on the electric motor 18 side because of the phase voltage for V-phase is canceled out with a noise current that flows through the stray capacitance C1 on the electric motor 18 side because of the phase voltage for W-phase. Consequently, common mode noise is reduced.

It should be noted, however, that in the odd-numbered PWM cycles Tc, a noise current that flows through the stray capacitance C1 because of the phase voltage for W-phase (first on/off pattern phase) is not canceled out with a noise current that flows through the stray capacitance C1 because of the phase voltage for a different phase. In the even-numbered PWM cycles Tc, in addition, a noise current that flows through the stray capacitance C1 because of the phase voltage for U-phase (first on/off pattern phase) is not canceled out with a noise current that flows through the stray capacitance C1 because of the phase voltage for a different phase. Common mode noise based on such noise currents that are not canceled out is reduced by the noise canceling circuit 32 as discussed later.

As in the embodiment, in the case where the on/off pattern for A-phase and B-phase is set to the first on/off pattern, the on/off pattern for the phase of a noise current that is not canceled out by the common mode noise reduction unit 67 is the first on/off pattern. In the case where the on/off pattern for A-phase and B-phase is set to the second on/off pattern, on the other hand, the on/off pattern for the phase of a noise current that is not canceled out by the common mode noise reduction unit 67 is the second on/off pattern.

Returning to FIG. 3, the canceling circuit control unit 52 includes a PWM count setting unit 81 and a second PWM output unit 82. The PWM count setting unit 81 sets a PWM count for performing PWM control on the FETs 44 and 45 in the noise canceling circuit 32 on the basis of the PWM count at the actual timing which is provided from the common mode noise reduction unit 67. Specifically, the PWM count setting unit 81 first extracts the pattern (non-canceling pattern) of PWM counts for which a noise current is not canceled out by the common mode noise reduction unit 67, among the PWM count at the actual timing.

In the case where the PWM count at the actual timing is as indicated in FIG. 12D, for example, the PWM count setting unit 81 extracts a PWM count value "40" for W-phase in the odd-numbered PWM cycles Tc and a PWM count value "400" for U-phase in the even-numbered PWM cycles Tc as the non-canceling pattern. Next, the PWM count setting unit 81 sets a PWM count in the same pattern as the extracted non-canceling pattern as a PWM count for performing PWM control on the FETs 44 and 45. In the case where the PWM count at the actual timing is as indicated in FIG. 12D, for example, the PWM count which is set by the PWM count setting unit 81 is as indicated in FIG. 15A.

Then, the PWM count setting unit 81 provides the PWM count, which is set in this manner, to the second PWM output unit 82 as a PWM count for each PWM cycle Tc in the next current control cycle Ta. The second PWM output unit 82 controls the FETs 44 and 45 of the noise canceling circuit 32 on the basis of the PWM count, which is provided from the PWM count setting unit 81 in the present current control cycle Ta, in the next current control cycle Ta.

In the embodiment, the on/off pattern for the phase of a noise current that is not canceled out by the common mode noise reduction unit 67 is the first on/off pattern. The second PWM output unit 82 generates a PWM signal such that the variation pattern of the on/off state of the upper FET 44 and the lower FET 45 in the PWM cycle Tc is the second on/off pattern. Consequently, a noise canceling current that is opposite in phase to a noise current that is not canceled out by the common mode noise reduction unit 67 can be generated by the noise canceling circuit 32.

Figure 16:
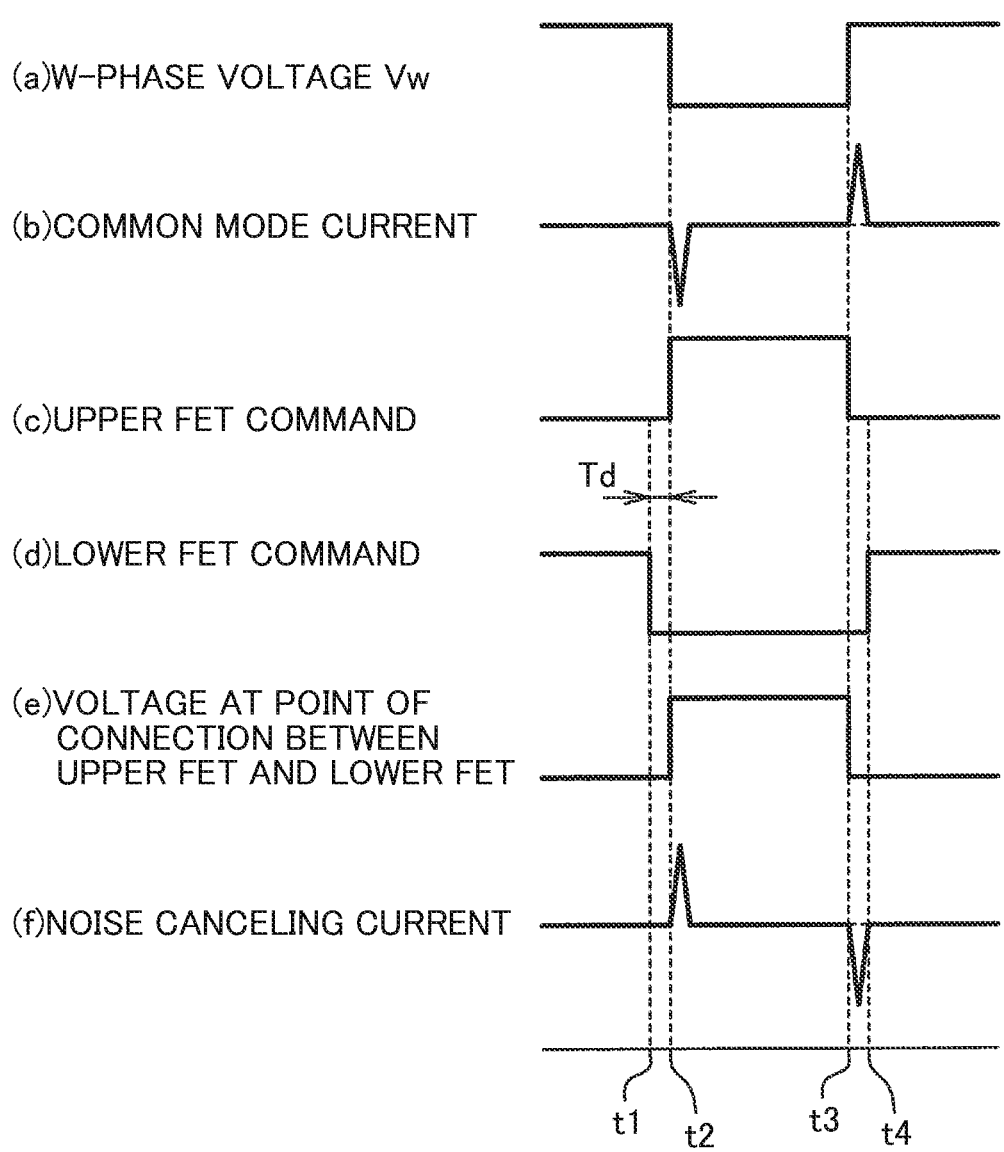
FIG. 16 is a time chart illustrating operation of the canceling circuit control unit and the noise canceling circuit.

Operation of the noise canceling circuit 32 for a case where the first PWM output unit 68 in the inverter control unit 51 generates a PWM signal on the basis of the final PWM count indicated in FIG. 12C and the second PWM output unit 82 in the canceling circuit control unit 52 generates a PWM signal on the basis of the PWM count indicated in FIG. 15A will be described. FIG. 16 is a time chart indicating the phase voltage $V_w$ for W-phase in the odd-numbered PWM cycles Tc, a command (upper FET command) for the upper FET 44 and a command (lower FET command) for the lower FET 45 in the noise canceling circuit 32, etc.

In the following description, the direction in which a current flows through the frame 130 is referred to as a + direction, and the direction in which a current is drawn from the frame 130 is referred to as a − direction. As indicated in FIG. 12D, the PWM count at the actual timing for W-phase in the odd-numbered PWM cycles Tc is "40". Thus, the W-phase voltage $V_w$ is varied from H level to L level at the time t2 when a time corresponding to a PWM count of "40" has elapsed from the time of start of the relevant PWM cycle Tc, and varied from L level to H level at the time t3 when a predetermined time has elapsed from the time t2 (see (a) in FIG. 16).

Thus, at the timing t2 when the W-phase voltage $V_w$ falls, a common mode current (current in the − direction) indicated in FIG. 16B flows through the stray capacitance C1 (see FIG. 3) which is present between the electric motor 18 and the frame 130. As indicated in FIG. 15A, the PWM count value for the noise canceling circuit 32 in the odd-numbered PWM cycles Tc is "40". The second PWM output unit 82 generates a PWM signal in the second on/off pattern. Thus, as indicated by (c) in FIG. 16, a command (upper FET command) for the upper FET 44 is varied from an off command to an on command at the time t2, and varied from an on command to an off command at the time t3. As indicated by (d) in FIG. 16, a command (lower FET command) for the lower FET 45 is varied from an on command to an off command at the time (time t1) the dead time Td earlier than the time t2, and varied from an off command to an on command at the time (time t4) when the dead time Td has elapsed from the time t3. A count value corresponding to the dead time is set to "10" as with the dead time which is used for the motor drive circuit 31.

The point of connection between the upper FET 44 and the lower FET 45 is connected to the − power source line 132 through the pull-down resistor 43. Therefore, during the dead time period, the voltage at the point of connection between the upper FET 44 and the lower FET 45 is at L level. Therefore, as indicated by (e) in FIG. 16, the period during which the voltage at the point of connection between the upper FET 44 and the lower FET 45 is at H level is equal to the period (period from t2 to t3) during which a command for the upper FET 44 is an on command.

Figure 17A:
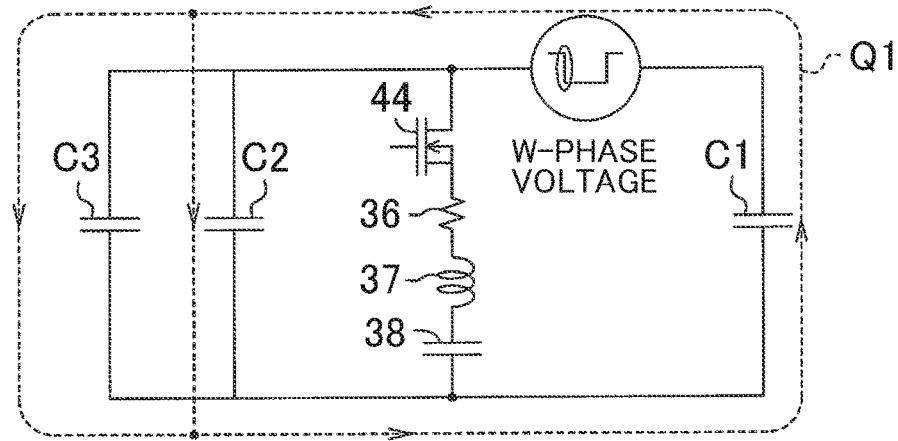
FIG. 17A is a schematic diagram illustrating the path of a common mode current that flows through a frame ground when a phase voltage for W-phase falls.
Figure 17B:
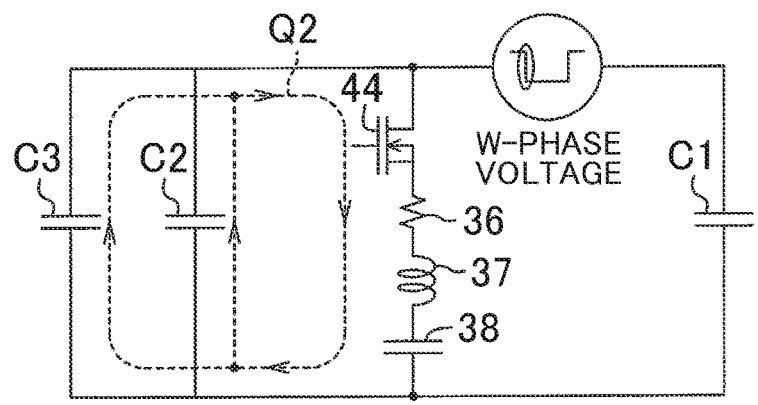
FIG. 17B is a schematic diagram illustrating the path of a noise canceling current generated by the noise canceling circuit at that time.
Figure 17C:
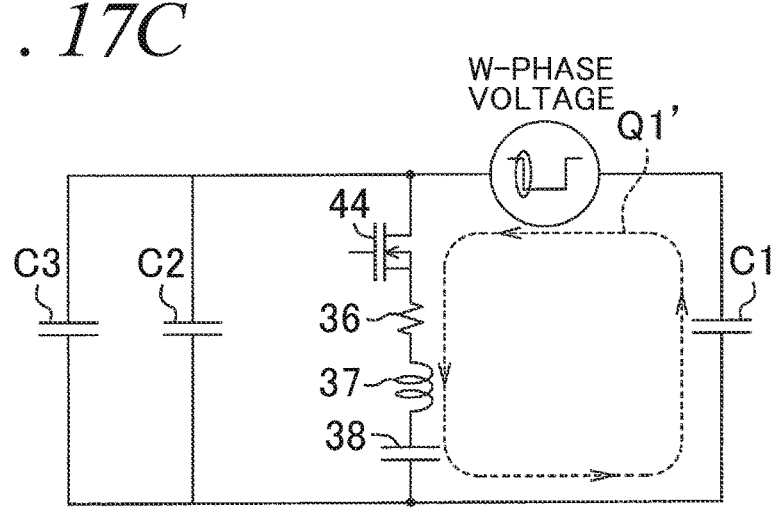
FIG. 17C is a schematic diagram illustrating the path of a common mode current after the cancellation.

As indicated by (e) in FIG. 16, the voltage at the point of connection between the upper FET 44 and the lower FET 45 is varied from L level to H level at the time t2. Thus, at the time t2, as indicated by (f) in FIG. 16, a noise canceling current (current in the + direction) that is opposite in phase to the common mode current which is indicated by (b) in FIG. 16 is generated by the noise canceling circuit 32 (RLC circuit 42). FIGS. 17A to 17C illustrate an equivalent circuit that places a focus on common mode noise currents. At the timing t2 when the W-phase voltage $V_w$ falls, a common mode noise current flows as indicated by the arrow Q1 in FIG. 17A because of the phase voltage $V_w$ for W-phase. At the time t2, in addition, a noise canceling current flows as indicated by the arrow Q2 in FIG. 17B because of the noise canceling circuit 32.

Because of the noise canceling current, the current in the − direction which flows through the electric motor 18 via the stray capacitance C1 from the frame 130 at the time t2 flows through the frame 130 via the upper FET 44 and the RLC circuit 42 as a current in the + direction as indicated by the arrow Q1' in FIG. 17C. Consequently, the common mode currents which flow through the stray capacitances C2 and C3 between the power source lines 131 and 132 and the frame 130, respectively, can be suppressed.

At the timing t3 when the W-phase voltage $V_w$ rises, on the other hand, a common mode current (current in the + direction) indicated by (b) in FIG. 16 flows through the stray capacitance C1 (see FIG. 3) which is present between the electric motor 18 and the frame 130. As indicated by (e) in FIG. 16, the voltage at the point of connection between the upper FET 44 and the lower FET 45 is varied from H level to L level at the time t3. Thus, at the time t3, as indicated by (f) in FIG. 16, a noise canceling current (current in the − direction) that is opposite in phase to the common mode current which is indicated by (b) in FIG. 16 is generated by the noise canceling circuit 32 (RLC circuit 42).

Figure 18A:
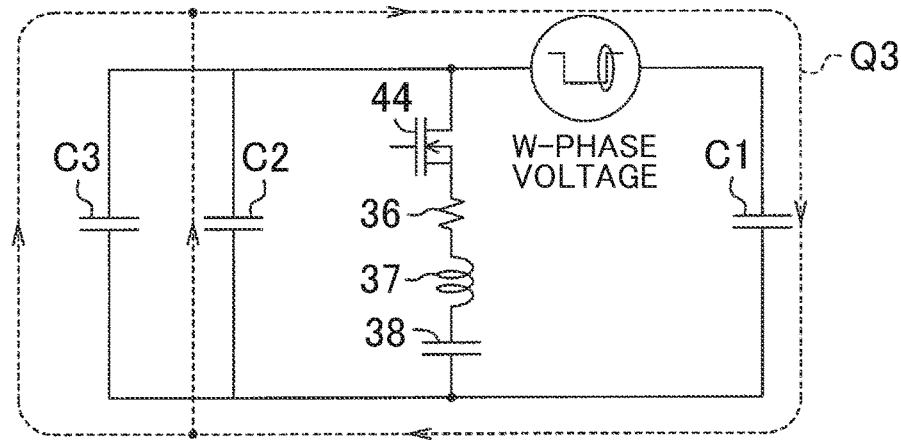
FIG. 18A is a schematic diagram illustrating the path of a common mode current that flows through a frame ground when a phase voltage for W-phase rises.
Figure 18B:
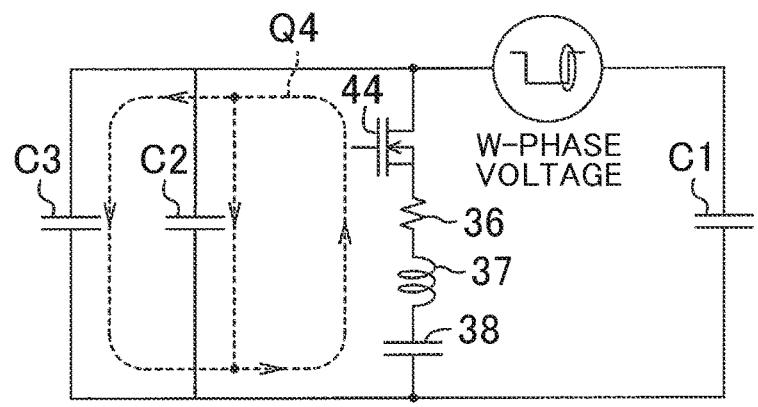
FIG. 18B is a schematic diagram illustrating the path of a noise canceling current generated by the noise canceling circuit at that time.
Figure 18C:
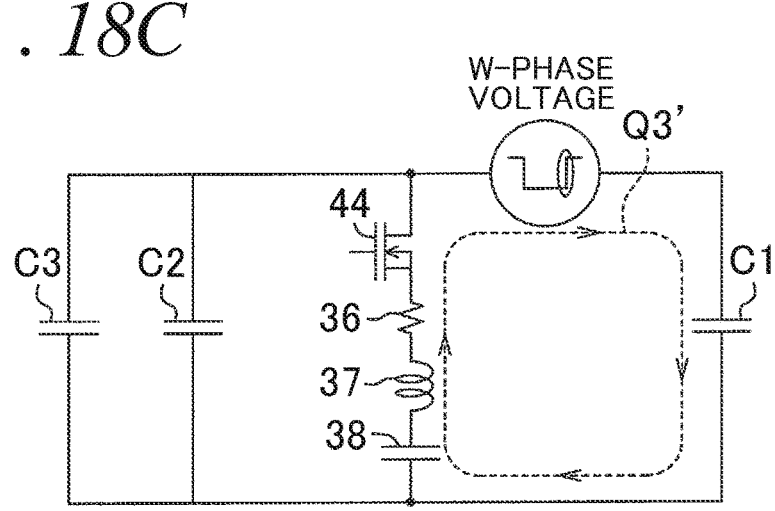
FIG. 18C is a schematic diagram illustrating the path of a common mode current after the cancellation.

FIGS. 18A to 18C illustrate an equivalent circuit that places a focus on common mode noise currents. At the timing t3 when the W-phase voltage $V_w$ rises, a common mode noise current flows as indicated by the arrow Q3 in FIG. 18A because of the phase voltage $V_w$ for W-phase. At the time t3, in addition, a noise canceling current flows as indicated by the arrow Q4 in FIG. 18B because of the noise canceling circuit 32. Because of the noise canceling current, the current in the + direction which flows through the frame 130 via the stray capacitance C1 from the electric motor 18 at the time t3 flows as a current in the − direction via the RLC circuit 42 from the frame 130 and further flows through the electric motor 18 via the upper FET 44 as indicated by the arrow Q3' in FIG. 18C. Consequently, the common mode currents which flow through the stray capacitances C2 and C3 between the power source lines 131 and 132 and the frame 130, respectively, can be suppressed.

That is, the common mode currents which flow through the stray capacitances C2 and C3 between the power source lines 131 and 132 and the frame 130, respectively, because of a noise current that cannot be canceled out by the common mode noise reduction unit 67 can be suppressed in the odd-numbered PWM cycles Tc. Also in the even-numbered PWM cycles Tc, the canceling circuit control unit 52 performs a process that is similar to that performed in the odd-numbered PWM cycles Tc discussed earlier. Consequently, the common mode currents which flow through the stray capacitances C2 and C3 between the power source lines 131 and 132 and the frame 130, respectively, because of a noise current that cannot be canceled out by the common mode noise reduction unit 67 can be suppressed in the even-numbered PWM cycles Tc.

In the embodiment discussed earlier, a current that flows through the frame ground 130 because of an output voltage for any one phase (e.g. V-phase) can be canceled out with a current that flows through the frame ground 130 because of an output voltage for one (e.g. U-phase or W-phase) of the two other phases in each PWM cycle Tc in the current control cycle Ta. In the embodiment discussed earlier, the noise canceling circuit 32 can generate a current that is opposite in phase to a current that flows through the frame ground 130 because of a phase voltage for the other (e.g. W-phase if the one of the two other phases is U-phase, and U-phase if the one of the two other phases is W-phase) of the two other phases in each PWM cycle Tc in the current control cycle Ta.

Consequently, common mode noise based on a current that flows through the frame ground 130 because of the phase voltages for all the three phases can be reduced in each PWM cycle Tc in the current control cycle Ta. Consequently, common mode noise can be reduced effectively. In the embodiment discussed earlier, the point of connection between the upper FET 44 and the lower FET 45 in the noise canceling circuit 32 is connected to the − power source line 132 through the pull-down resistor 43. As indicated by the long dashed short dashed line in FIG. 2, however, the point of connection between the upper FET 44 and the lower FET 45 may be connected to the + power source line 131 via a pull-up resistor 49, rather than being connected to the − power source line 132 through the pull-down resistor 43.

In this case, during the dead time period, the voltage at the point of connection between the upper FET 44 and the lower FET 45 is at H level. Thus, the time when the voltage at the point of connection between the upper FET 44 and the lower FET 45 is varied from L level to H level is earlier than the time when a command for the upper FET 44 is varied from an off command to an on command by the dead time period. Therefore, in this case, it is necessary to delay the timing to turn on the upper FET 44 and the timing to turn off the lower FET 45 by the dead time period compared to a case where the point of connection between the upper FET 44 and the lower FET 45 is pulled down. Thus, in this case, the PWM count setting unit 81 in the canceling circuit control unit 52 performs the following process.

That is, the PWM count setting unit 81 first extracts the pattern (non-canceling pattern) of PWM counts for which a noise current is not canceled out by the common mode noise reduction unit 67, among the PWM count at the actual timing. Next, the PWM count setting unit 81 adds a count value ("10" in the embodiment) corresponding to the dead time period to the PWM count in the extracted non-canceling pattern. Then, the PWM count setting unit 81 sets a PWM count in the same pattern as the non-canceling pattern, to which the count value corresponding to the dead time period has been added, as a PWM count for performing PWM control on the FETs 44 and 45. In the case where the PWM count at the actual timing is as indicated in FIG. 12D, for example, the PWM count which is set by the PWM count setting unit 81 is as indicated in FIG. 15B. Then, the PWM count setting unit 81 provides the PWM count, which is set in this manner, to the second PWM output unit 82 as a PWM count for each PWM cycle Tc in the next current control cycle Ta.

In the embodiment discussed earlier, the on/off pattern for A-phase and B-phase is the first on/off pattern. However, the on/off pattern for A-phase and B-phase may be the second on/off pattern. In this case, the second PWM output unit 82 in the canceling circuit control unit 52 generates a PWM signal such that the variation pattern of the on/off state of the upper FET 44 and the lower FET 45 in the PWM cycle Tc is the first on/off pattern.

In the above embodiment, the present invention is applied to a motor control device for an electric power steering system. However, the present invention is also applicable to a motor control device that is used for devices other than an electric power steering system. Besides, a variety of design changes may be made without departing from the scope defined in the claims.

What is claimed is:

1. A motor control device that includes a three-phase inverter configured to drive an electric motor having a housing connected to a frame ground to which a negative terminal of a power source is connected, and a control unit that controls the three-phase inverter on the basis of a PWM signal in units of PWM cycles generated for each PWM cycle, a current control cycle including a plurality of PWM cycles, the motor control device comprising:

a PWM count computation unit that computes a PWM count in units of current control cycles for each of three phases for each current control cycle;

a noise reduction unit that sets a PWM count in units of PWM cycles for each PWM cycle in the current control cycle such that a total value of PWM counts for each phase in units of PWM cycles in the current control cycle is a value that matches a PWM count in units of current control cycles for the corresponding phase, and such that a current that flows through the frame ground because of a phase voltage for any one of the three phases is canceled out with a current that flows through the frame ground because of a phase voltage for one of the two other phases in each PWM cycle in the current control cycle; and
a noise canceling circuit configured to generate a current that is opposite in phase to a current that flows through the frame ground because of a phase voltage for the other of the two other phases in each PWM cycle in the current control cycle.

2. The motor control device according to claim 1, wherein the noise canceling circuit includes
   a half-bridge circuit connected to the power source in parallel with the three-phase inverter, and
   an RLC circuit connected between a midpoint of the half-bridge circuit and the frame ground, the RLC circuit being a series circuit of a resistor, a coil, and a capacitor.

3. The motor control device according to claim 2, wherein the noise reduction unit includes
   a unit that sets the PWM count in units of current control cycles for each phase in the current control cycle as a PWM count in units of PWM cycles for each PWM cycle in the relevant current control cycle for the corresponding phase, and
   a unit that changes the PWM count in units of PWM cycles for one of the two other phases in each PWM cycle in the current control cycle such that an output voltage waveform for the relevant phase is obtained by inverting an output voltage waveform for the any one of the three phases.

4. The motor control device according to claim 1, wherein the noise reduction unit includes
   a unit that sets the PWM count in units of current control cycles for each phase in the current control cycle as a PWM count in units of PWM cycles for each PWM cycle in the relevant current control cycle for the corresponding phase, and
   a unit that changes the PWM count in units of PWM cycles for one of the two other phases in each PWM cycle in the current control cycle such that an output voltage waveform for the relevant phase is obtained by inverting an output voltage waveform for the any one of the three phases.

* * * * *